(12) United States Patent
Shimoyama et al.

(10) Patent No.: US 7,244,214 B2
(45) Date of Patent: Jul. 17, 2007

(54) SPEED CHANGE DEVICE AND STEERING SYSTEM

(75) Inventors: Osamu Shimoyama, Yokohama (JP); Jun Sugihara, Yokosuka (JP); Tsuyoshi Sakuma, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 218 days.

(21) Appl. No.: 11/049,289

(22) Filed: Feb. 3, 2005

(65) Prior Publication Data

US 2005/0205340 A1    Sep. 22, 2005

(30) Foreign Application Priority Data

| Feb. 3, 2004 | (JP) | ............................. 2004-027064 |
| Feb. 3, 2004 | (JP) | ............................. 2004-027068 |
| Jul. 29, 2004 | (JP) | ............................. 2004-222321 |

(51) Int. Cl.
*F16H 57/08* (2006.01)

(52) U.S. Cl. ............................. 475/335; 475/4; 74/409; 180/444

(58) Field of Classification Search ................ 180/444; 475/3, 4, 335, 338, 339; 74/492, 425, 388 PS, 74/496, 409, 440
See application file for complete search history.

(56) References Cited

U.S. PATENT DOCUMENTS 5,092,190 A * 3/1992 Kubo et al. ................... 74/410

2004/0154422 A1 * 8/2004 Menjak et al. ................ 74/440

FOREIGN PATENT DOCUMENTS

| DE | 3801461 A1 * | 8/1989 |
| JP | 56-045824 B2 | 10/1981 |
| JP | 08-291848 A | 11/1996 |
| JP | 2002-213566 A | 7/2002 |

* cited by examiner

*Primary Examiner*—Sherry Estremsky
*Assistant Examiner*—Edwin A. Young
(74) *Attorney, Agent, or Firm*—Foley & Lardner LLP

(57) ABSTRACT

A speed change device has an input member rotatable in opposite directions to transmit higher torque as its rotation angle becomes larger, and a variable angle-ratio change mechanism including rollers and teethed wheels that are arranged in parallel to each other. The rollers and teethed wheels are respectively connected to rotate together with each other. The teeth of the wheels have a clearance on a pitch circle between their adjacent teeth so that the clearance is larger than a slip amount of the rollers in a low torque range where the rollers transmit low torque with bypassing the wheels in a normal operation. The wheels are engaged with each other to transmit high torque in a high torque range where the high torque is applied in an exceptional operation and the rollers slip larger than the slip amount in the low torque range.

22 Claims, 29 Drawing Sheets

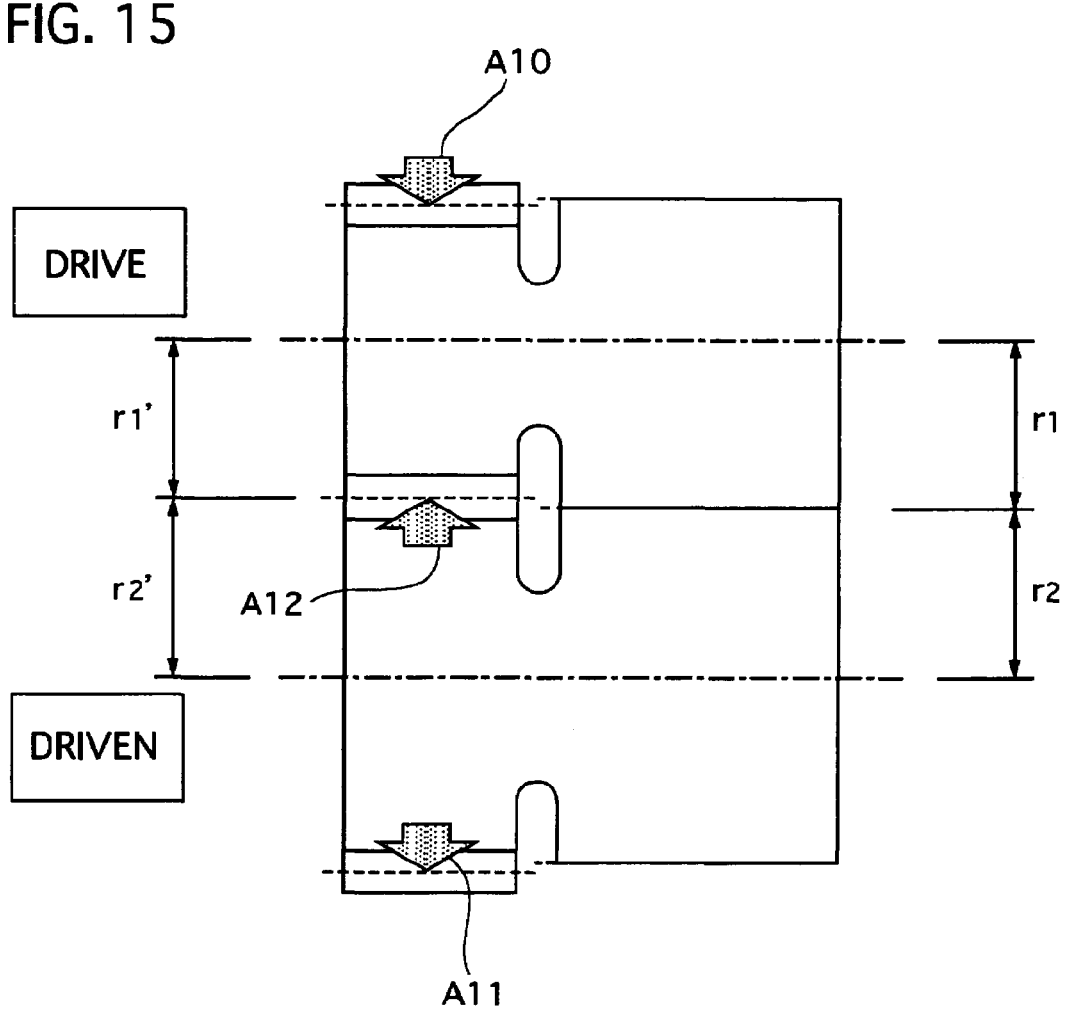

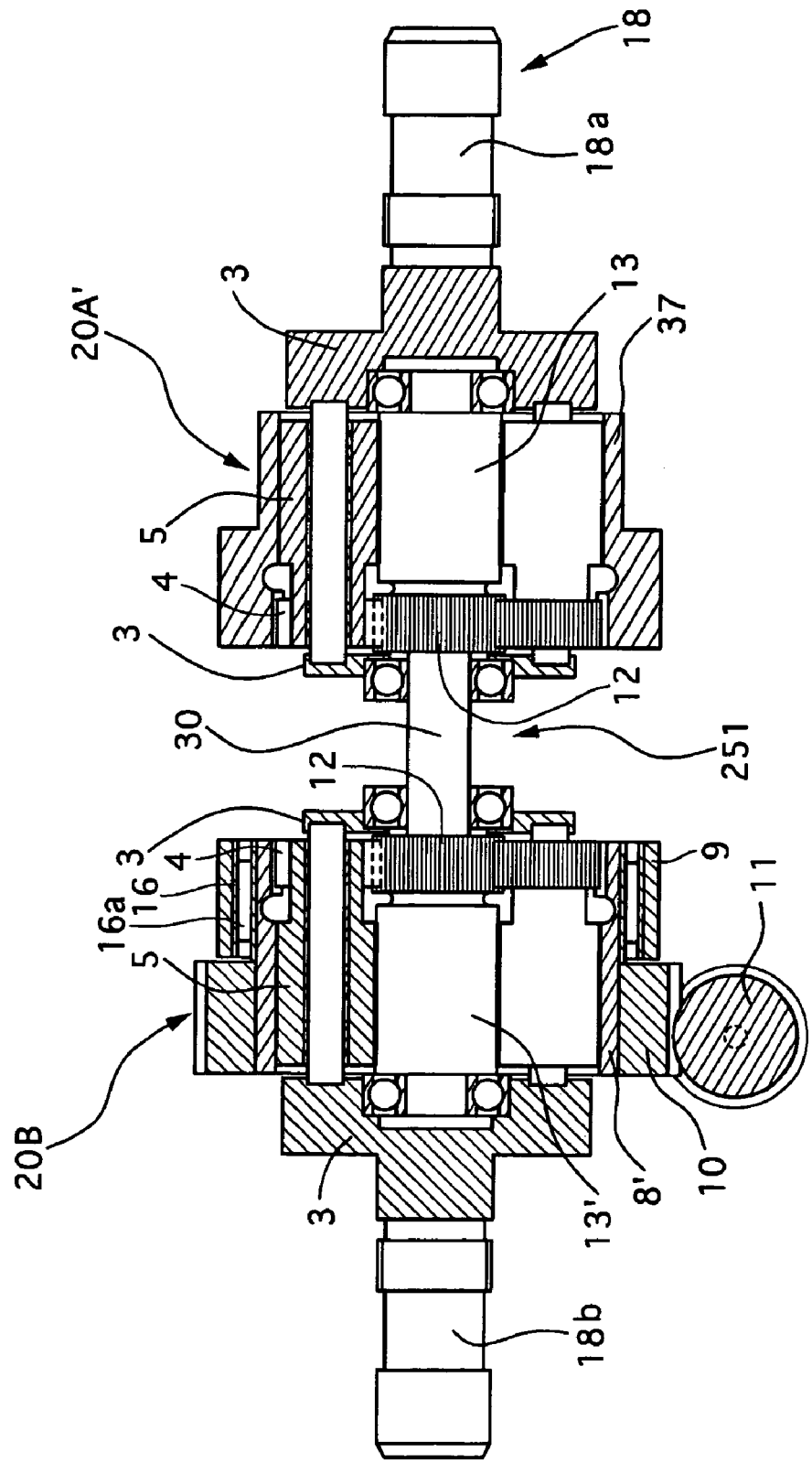

SPEED CHANGE DEVICE AND STEERING SYSTEM

BACKGROUND OF THE INVENTION

1. Field of the Invention

The present invention relates to a speed change device that is capable of changing speed and torque between an input member and an output member, and also relates to a steering system using the speed change device to change a steering angle ratio thereof.

2. Description of the Related Art

A steering system with a speed change mechanism of this kind is disclosed in Japanese examined patent publication No. (Sho) 56-45824. This steering system has a speed change device disposed between an input shaft connected with a steering shaft and an output shaft connected with steering gears. The speed change device includes a first and second planetary gear sets arranged symmetrically to each other, and one of the sets can be controlled to change a transmission ratio. In the steering system, however, the planetary gear sets cause slapping gear noise and play between the adjacent gear teeth, impairing steering operation feeling. Improving the precision of a tooth configuration for avoiding these disadvantages brings high manufacturing cost and large resistance torque in steering operation.

Another variable steering system of this kind is disclosed in Japanese patent laying-open publication No. (Hei) 08-291848. This steering system is equipped with a speed change device consisting of two planetary roller sets disposed between an input shaft connected with a steering shaft and an output shaft connected with steering gears. However, the rollers cause a large slip therebetween in high torque range, decreasing transmitting torque. Using larger torque-transmittable rollers for reducing the slip amount brings large resistance torque in steering operation.

Incidentally, Japanese patent laying-open publication No. 2002-213566 discloses a speed change device having a planetary roller set and a planetary gear set that are arranged in parallel to each other between an input shaft and an output shaft. In this device, a sun roller is connected with a sun gear, planetary rollers are connected with planetary pinions, and a ring roller is connected with a ring gear so as to remove the above disadvantages of the conventional steering systems.

The above known conventional speed change device, however, encounters a problem that it is not suitable for a steering system of a motor vehicle. The reason comes from that the conventional speed change drive is constructed so that the rollers with the gears rotate continuously for a certain period in one rotational direction or the other rotational direction. This operation is different from an operation, such as in a steering operation of a motor vehicle.

The gears used in this conventional speed change device are formed to have backlash, which is set very small, so that the gears can rotate smoothly and high-efficiently during continuously rotating. When the above conventional speed change device is used in a steering system, the input to the gears are continually changed in its rotating direction and in the amount of torque, which causes the gears to easily and frequently engage with each other during the steering operation, even in a normal steering operation when the vehicle runs. This frequent engagement of the gears impairs a steering operation feeling of a driver.

It is, therefore, an object of the present invention to provide a speed change device which overcomes the foregoing drawbacks and can smoothly transmit torque under the circumstances such that input changes continuously or frequently in the amount of input torque and an input direction.

It is, therefore, another object of the present invention to provide a steering system which overcomes the foregoing drawbacks and can be operated smoothly in a normal steering operation and ensure high torque at variable steering angle in an exceptional steering operation, such when a motor vehicle is stopped and a steering wheel is rotated at a large angle.

SUMMARY OF THE INVENTION

According to a first aspect of the present invention there is provided a speed change device comprising: an input member that is rotatable in opposite directions from a normal position within limited rotation angles, the input member transmitting higher torque as a rotation angle thereof from the normal position becomes larger; an output member; and a variable angle-ratio change mechanism including rollers and teethed wheels that are arranged in parallel to each other and capable of transmitting torque between the input and output members, the rollers being capable of changing a speed ratio between the input member and the output member, and the teethed wheel being capable of changing a speed ratio between the input and output members; wherein the rollers and the teethed wheels are respectively connected to rotate together with each other; the teethed wheels being provided with teeth that have a clearance on a pitch circle of the teethed wheels between adjacent teeth thereof, the clearance being set larger than a slip amount of the rollers in a low torque range where the rollers transmit low torque between the input and output members with bypassing the teethed wheels in a normal operation; and the teethed wheels being engageable with each other to transmit high torque between the input and output members in a high torque range where the high torque is applied between the input and output members in an exceptional operation and the rollers slip larger than the slip amount in the low torque range.

According to a second aspect of the present invention there is provided a steering system comprising: a steering wheel; a steering gears; a speed change device disposed between the steering wheel and the steering gears, the speed change device including a variable steering-angle-ratio change mechanism equipped with an input member connected with the steering wheel, an output member connected with the steering gears, a planetary roller set, a planetary teethed wheel set, and a steering-angle-ratio control motor, the planetary roller set and the planetary teethed wheel set that are arranged in parallel to each other and between the input and output members and capable of transmitting torque between the input and output members, the planetary roller set having a sun roller, a ring roller, planetary rollers rotatably supported by a planetary carrier and contacting with the sun roller and the ring roller, the planetary teethed wheel set having a sun teethed wheel connected with the sun roller, a ring teethed wheel connected with the ring roller, planetary teethed wheels respectively connected with the planetary rollers and rotatably supported by the planetary carrier to contact with the sun teethed wheel and the ring teethed wheel, wherein the sun roller is connected with the sun teethed wheel, the ring roller being connected with the ring teethed wheel, the planetary rollers being respectively connected with the planetary teethed wheels, the teethed wheels being provided with teeth that have a clearance on a pitch circle of the teethed wheels between adjacent teeth thereof, the clearance being set larger than a slip amount of the rollers in a low torque range where the rollers transmit low torque between the input and output members with bypassing the teethed wheels in a normal steering operation; and the teethed wheels being engageable with each other to transmit high torque between the input and output members in a high torque range where the high torque is applied between the input and output members in an exceptional steering operation and the rollers slip larger than the slip amount in the low torque range.

BRIEF DESCRIPTION OF THE DRAWINGS

The objects, features and advantages of the present invention will become apparent as the description proceeds when taken in conjunction with the accompanying drawings, in which:

FIG. 15 is a diagram illustrating pitch radiuses of teethed wheels and outer radiuses of the rollers integrated with the rollers, respectively;

FIG. 29 is a cross sectional view showing a steering system with a speed change device according to a fourteenth embodiment of the present invention.

DETAILED DESCRIPTION OF THE PREFERRED EMBODIMENTS

Figure 1:
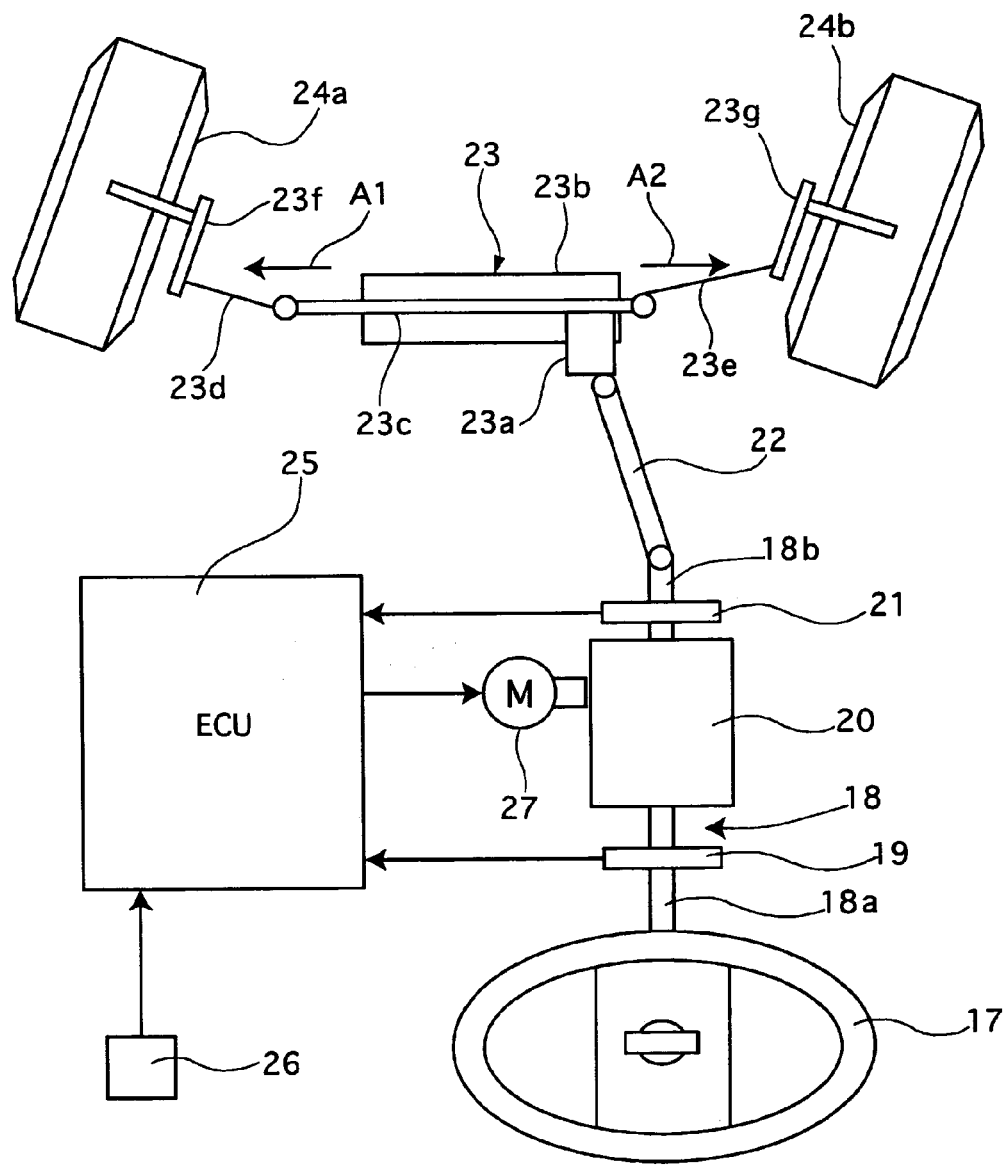
FIG. 1 is a schematic diagram showing a steering system with a speed change device according to a first embodiment of the present invention.

Throughout the following detailed description, similar reference characters and numbers refer to similar elements in all figures of the drawings, and their descriptions are omitted for eliminating duplication.

A steering system with a speed change device of the first preferred embodiment will be described with reference to the accompanying drawings of FIGS. 1 to 6. In this embodiment, the speed change device is applied to the steering system of a motor vehicle.

The steering system includes a steering wheel 17 that a driver manually operates, a steering gears/linkage 23 to transmit steering torque inputted from the steering wheel 17 to left and right front wheels 24a and 24b, and a variable steering-angle-ratio change mechanism 20 to change a steering ratio between the steering wheel 17 and the steering gears/linkage 23.

The steering wheel 17 and the steering gears/linkage 23 are mechanically connected with each other through an upper steering shaft 18, the variable steering-angle-ratio change mechanism 20, and a lower steering shaft 22. The upper steering shaft 18 consists of an upper part 18a to transmit the steering torque inputted from the steering wheel 17 to the change mechanism 20 and a lower part 18b to receive output steering torque outputted from the change mechanism 20.

The steering gears/linkage 23 has a pinion 23a connected with a lower end portion of the lower steering shaft 22, a rack 23c meshed with the pinion 23a and extending in a latitudinal direction of the motor vehicle, left and right tie rods 23d and 23e respectively connected at the end portions of the rack 23c, and left and right knuckle arms 23f and 23g connected between the left tie rod 23d and the left wheel 24a and between the right tie rod 23e and the right wheel 24b, respectively. When the rack 23c moves in a direction indicated by an arrow A1, the vehicle turns in a clockwise direction, while it turns in a counterclockwise when the rack 23c moves in a direction indicated by an arrow A2.

The variable steering-angle-ratio change mechanism 20 is disposed between an upper part 18a and a lower part 18b of the upper steering shaft 18, and equipped with an electric motor 27 for changing a transmission ratio between the upper and lower steering shafts 18 and 22. A structure of the variable steering-angle-ratio change mechanism 20 will be described in detail later. The variable steering-angle-ratio change mechanism 20 corresponds to a speed change device of the present invention.

The motor 27 is controlled in its rotational speed and its rotational direction by a electronic control unit 25, which is electrically connected to an input steering angle sensor 19 disposed between the steering wheel 17 and the variable steering-angle-ratio change mechanism 20, an output steering angle sensor 21 disposed between the variable steering-angle-ratio change mechanism 20 and the lower steering shaft 22, and a vehicle speed sensor 26. The motor 27 acts as a steering-angle-ratio control motor of the present invention.

The input steering angle sensor 19 detects an input steering angle inputted from the steering wheel 17 and outputs an input steering angle signal, the output steering angle sensor 21 detects an output steering angle outputted from the variable steering angle ratio mechanism 20 and outputs an output steering angle signal, and the vehicle speed sensor 26 detects vehicle speed and outputs a vehicle speed signal. The electronic control unit 25 receives the signals from the sensors 19, 21, and 26 and drives the motor 27 under feedback control based on the signals so that a target steering angle becomes to be equal to the actual steering angle obtained by the input steering angle sensor 19.

Figure 2:
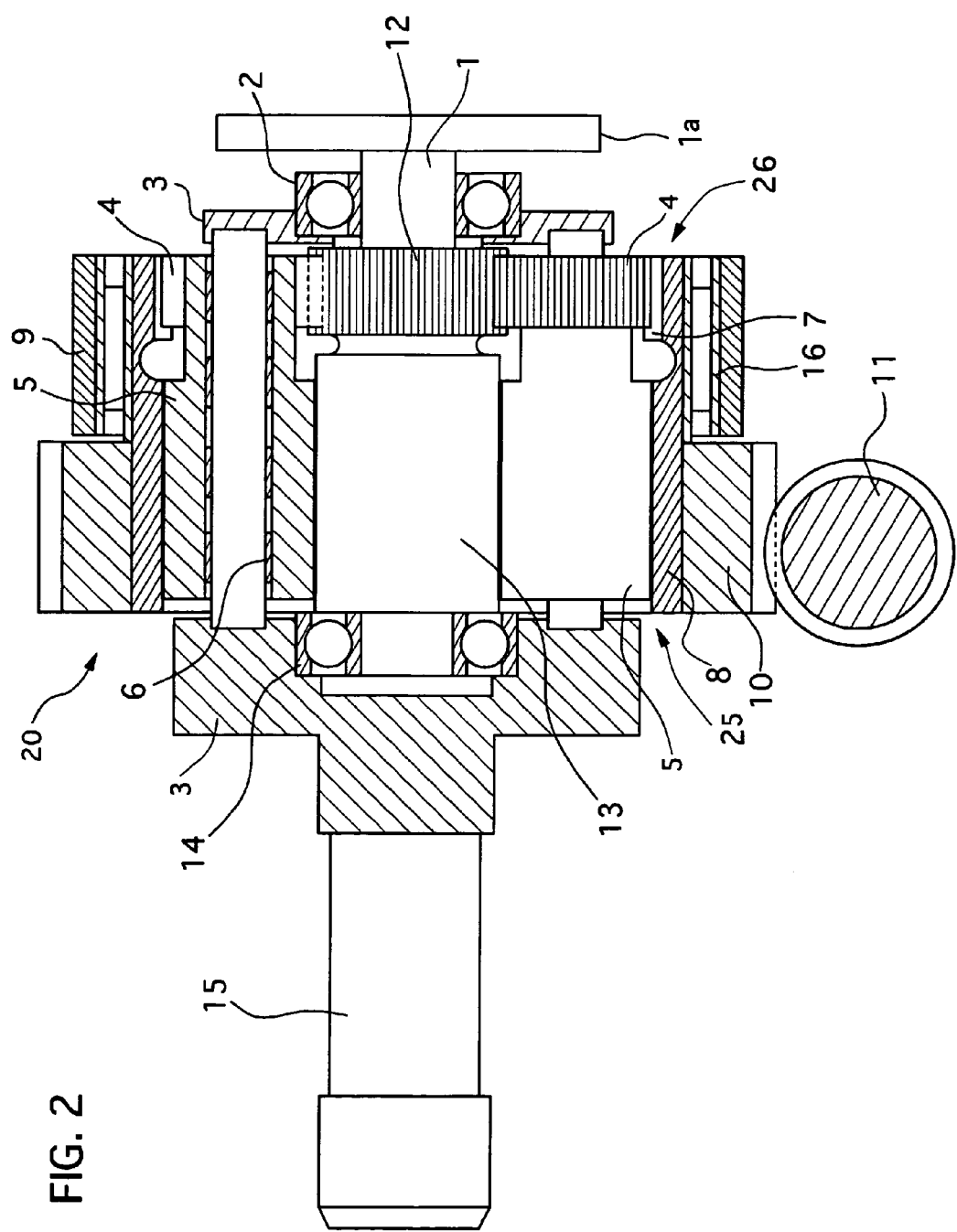
FIG. 2 is an enlarged cross sectional view of the speed change device that includes rollers and teethed wheels.

FIG. 2 shows an enlarged cross-sectional view of the variable steering-angle-ratio change mechanism 20 used in the steering system shown in FIG. 1.

The variable steering-angle ratio change mechanism 20 includes an input shaft 1 integrally formed at its end portion with a flange 1a, an output shaft 15, a planetary roller set 25 to transmit low torque between the input and output shafts 1 and 15, and a planetary teethed wheel set 26 to transmit high torque between the input and output shafts 1 and 15. The planetary roller set 25 includes a sun roller 13, plural planetary rollers 5 contacting with the sun roller 13, a ring roller 8 contacting with the planetary rollers 5, and a planetary carrier rotatably supporting the planetary rollers 5 through a needle roller bearing 6. The planetary teethed wheel set 26 includes a sun teethed wheel 12, plural planetary teethed wheel 4 engageable with the sun teethed wheel 12, a ring teethed wheel 7 engageable with the planetary teethed wheel 12, and the planetary carrier 3 rotatably supporting the planetary teethed wheel 12 through the needle roller bearing 6.

The sun roller 13, the sun teethed wheel 12 and the input shaft 1 are integrally formed with each other, the planetary rollers 5 and the planetary teethed wheels 4 are integrally formed with each other, respectively, and the ring roller 8 and the ring teethed wheel 7 are integrally formed with each other, so that the planetary roller set 25 and the planetary teethed wheel set 26 are arranged in parallel to each other between the input and output shafts 1 and 15.

The planetary carrier 3 is rotatably supported at its input portion on the input shaft 1 through a roller bearing 2, and connected at its output portion with the output shaft 15. The input shaft 1, integrally formed with the sun roller 13 and the sun teethed wheel 12, is rotatably supported by the output shaft 15 through a roller bearing 14, all of which are arranged in concentric with each other.

The planetary roller set 25 is set to transmit the torque between the input and output shafts 1 and 15 by traction caused between the rollers with bypassing the planetary teethed wheel set 26 in a low torque range, while the planetary teethed wheel set 26 is set to transmit torque between the input and output shafts 1 and 15 in a high torque range.

In order to change the transmission ratio between the input and output shafts 1 and 15, the ring roller 8 integral with the ring teethed wheel 7 is rotatably supported by a not-shown case through a needle roller bearing 16, and provided at an outer periphery thereof with a worm wheel 10, which engages with a worm 11 connected to an output shaft of the motor 27. Worm gears consisting of the worm 11 and the worm wheel 10 are set so that worm 11 can drive the worm wheel 10, while the worm wheel 10 can not drive the worm 11 by properly setting their helix angle. The ring roller 8 is held when the motor 27 is stopped, while the transmission ratio is changed when the motor 27 rotates the ring roller 8.

The above constructed speed change device is applied to the steering system shown in FIG. 1, so that the flange 1a of the input shaft 1 is connected with the upper part 18a of the upper steering shaft 18, and the output shaft 15 is connected with the lower part 18b of the upper steering shaft 18. The input shaft 1 corresponds to an input member of the present invention, and the output shaft 15 corresponds to an output member of the present invention.

In addition, the low torque range, where the planetary roller set 25 transmits the torque between the input and output shafts 1 and 15 by traction with bypassing the planetary teethed wheel set 26, is set to cover steering torque inputted from the steering wheel 17 in a normal steering operation when the vehicle running. In the normal steering operation, a steering angle of the steering wheel 17 is limited. The high torque range, where the planetary teethed wheel set 26 transmits torque between the input and output shafts 1 and 15 without the traction of the rollers, is set to cover high torque caused when the vehicle is substantially stopped and the steering wheel 17 is operated up to a larger steering angle than a normal steering angle in the running vehicle.

There is, therefore, provided with clearances between adjacent teeth of the sun teethed wheel 12 and the planetary teethed wheels 4 and between the adjacent teeth of the planetary teeth wheels 4 and the ring teethed wheel 7, respectively so that the clearances on a pitch circle of the teethed wheels become larger than a slip amount of the rollers in the low torque range. Therefore, the teethed wheels 12, 4, and 7 become in mesh to transmit the high torque between the input and output shafts 1 and 15 with bypassing the planetary roller set 25 in the high torque range. Note that the clearance is far larger than the conventional backlash of gears.

The operation of the steering system of the first embodiment is as follows.

The steering wheel 17 is rotatable in opposite directions from a normal position within limited rotation angles. The normal position corresponds to a steering angle at which the vehicle runs straight on a flat level surfaced road. The steering torque becomes higher as its steered angle from the normal position becomes larger.

Figure 3:
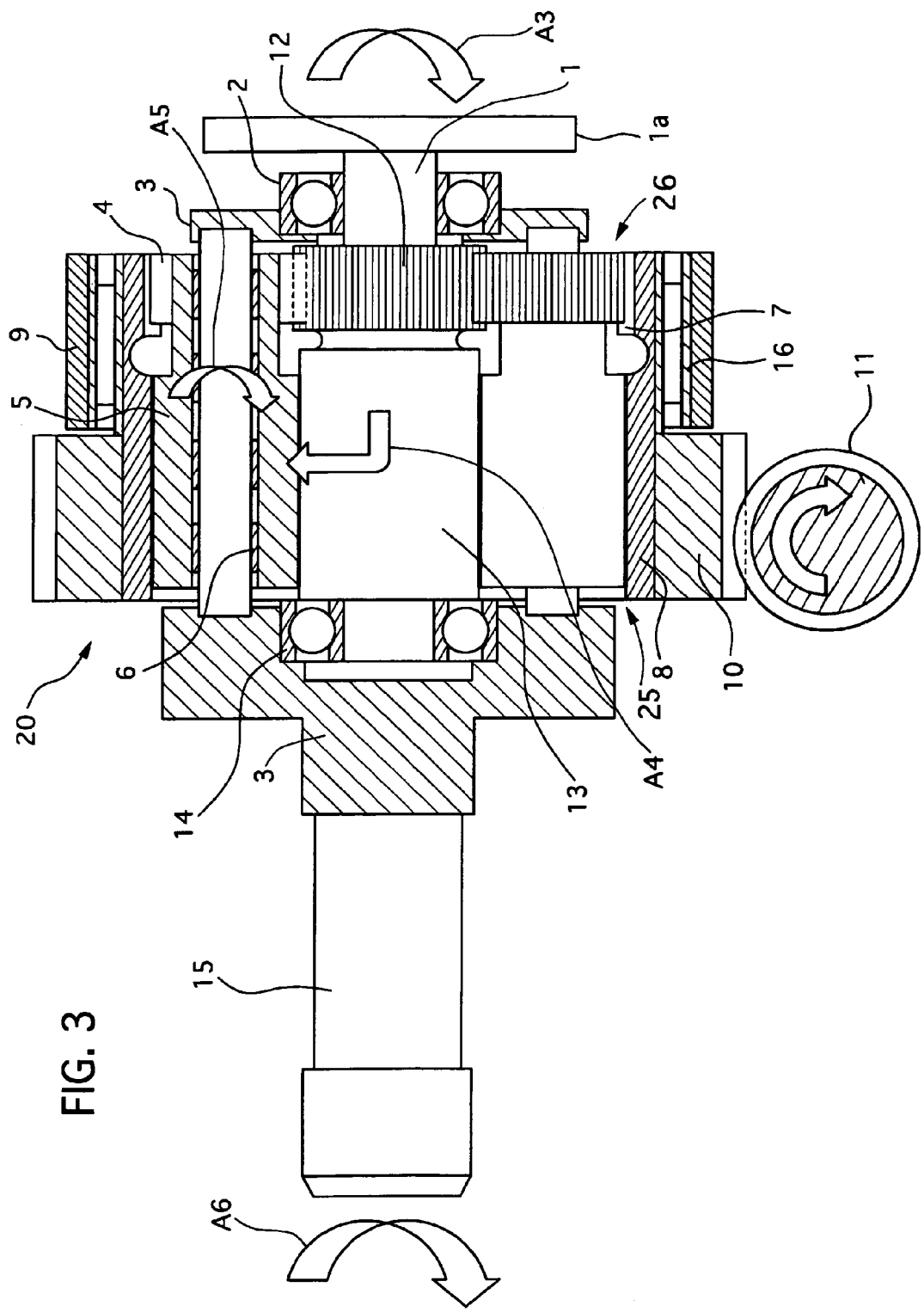
FIG. 3 is a cross sectional view illustrating a torque flow in the speed change device in a low torque range where only the rollers transmit inputted steering torque.

FIG. 3 shows a torque transmitting state of the speed change device in the low torque range, where an inputted steering angle is low. This normal steering operation is frequently performed, typically when steering at intermediate or high speed running.

When low steering torque operation is inputted in a steered direction indicated by an arrow A3 from the steering wheel 17 to the variable steering-angle-ratio change mechanism 20 through the upper part 18a of the upper steering shaft 18, the sun roller 13 and the sun teethed wheel 12 are rotated in the same direction of the arrow A3 to rotate the planetary rollers 8 in a direction, indicated by an arrow A5, opposite to the steered direction. This brings the planetary carrier 3 and the output shaft 15 to be rotated in a direction indicated by an arrow A6, the same direction as the steered direction. In this low torque range, the inputted steering torque is transmitted from the input shaft 1 to the output shaft 15 only by the traction of the planetary roller set 25 as indicated by an arrow A4, and the teethed wheels 12, 4, and 7 are not engaged, because the clearances of the adjacent teeth of the planetary teethed wheel set 6 are set larger than the slip amount of the rollers 13, 5, and 8 of the planetary roller set 25 in the low torque range.

Figure 4:
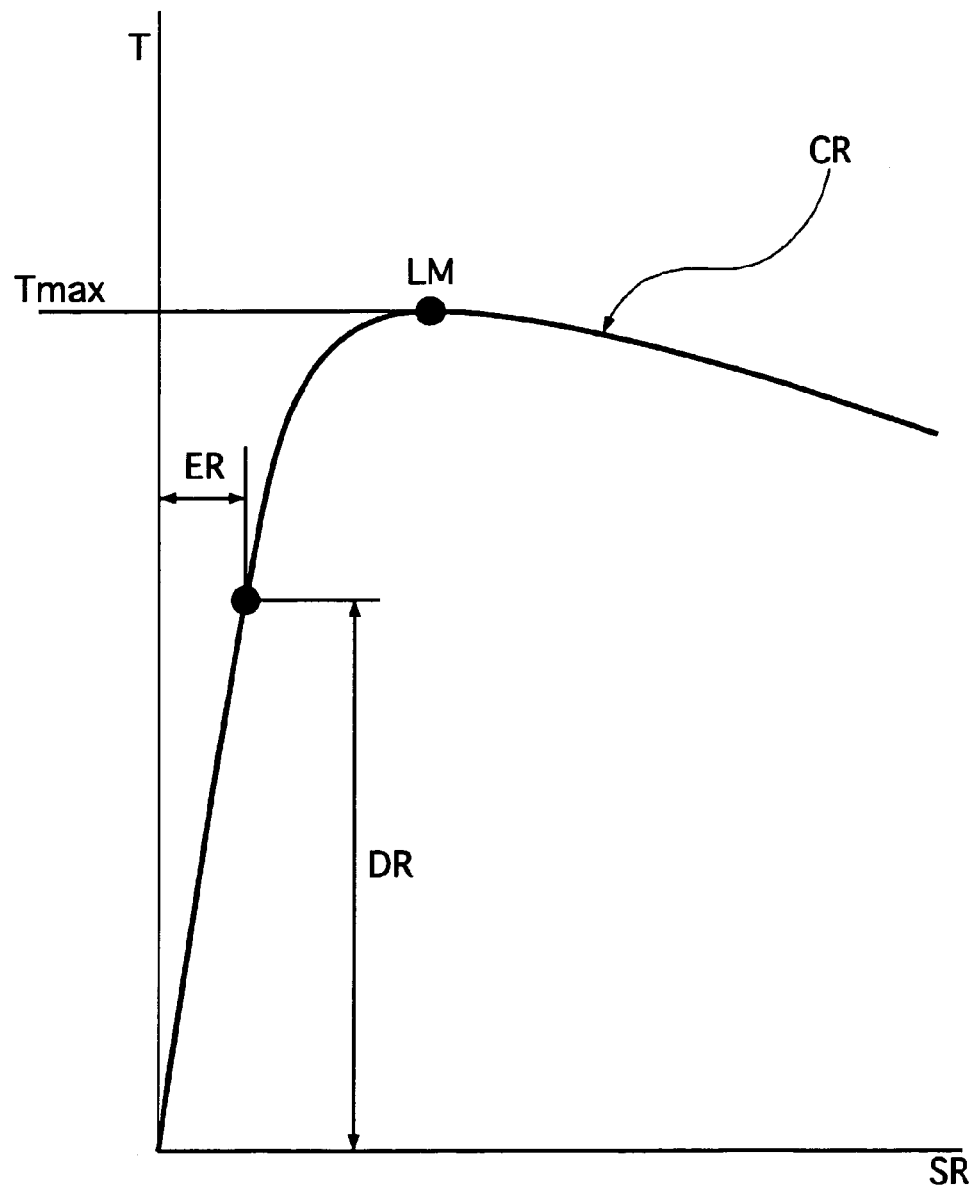
FIG. 4 is a diagram showing a relationship between a slip ratio of the rollers and torque transmittable by the rollers.
Figure 5:
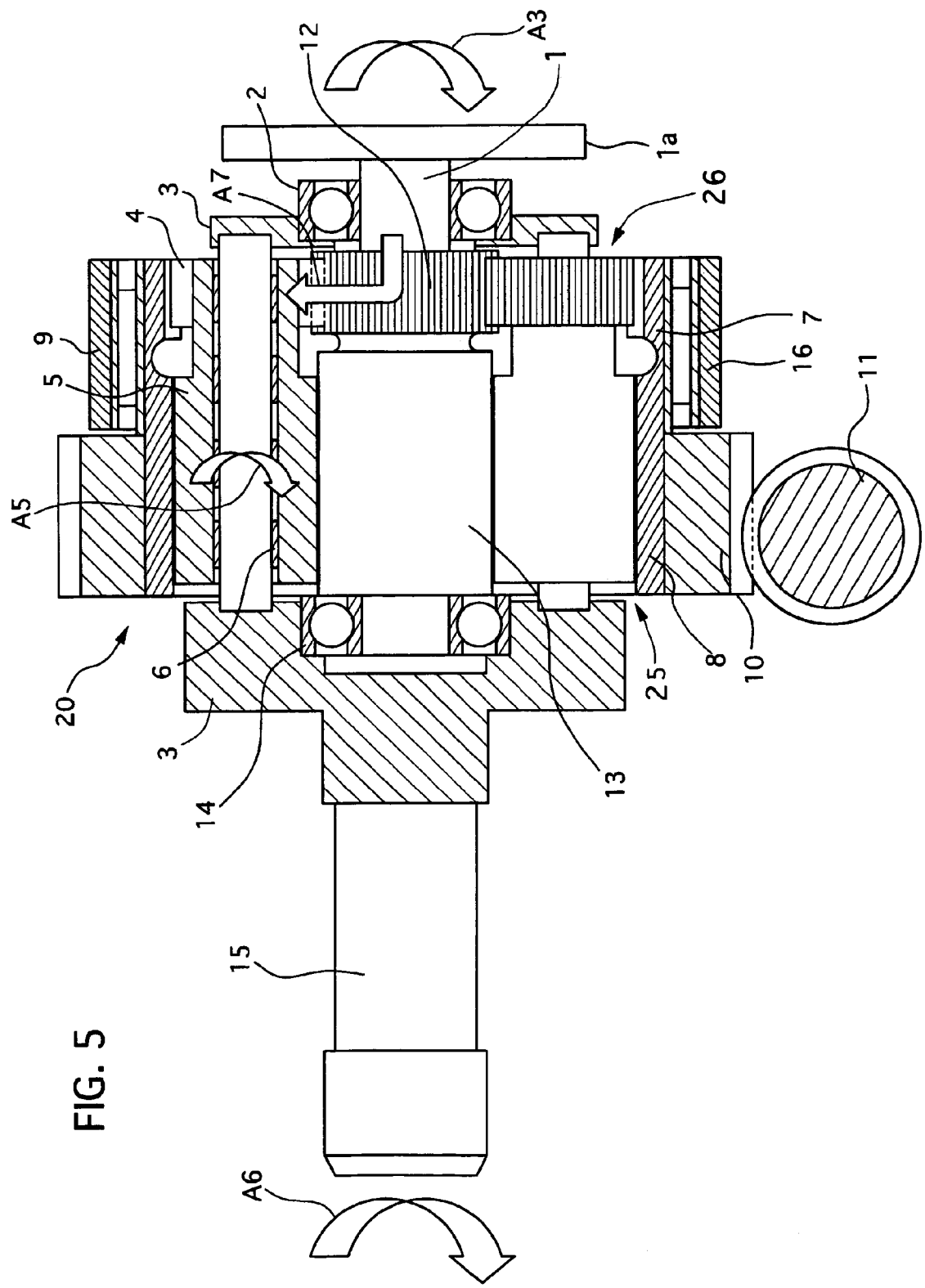
FIG. 5 is a cross sectional view illustrating a torque flow in the speed change device in a high torque range where the teethed wheels transmit the steering torque.

FIG. 4 shows a torque transmitting characteristic CR of the rollers between a slip ratio SR of the rollers and torque T transmittable between the input and output shafts 1 and 15. Normally, rollers have the torque transmitting characteristic CR such that transmitting torque T varies due to the slip ratio SR between the rollers. The transmitting torque T is substantially proportional to the slip ratio SR in an elasticity region ER, a small slip ratio range. As the slip rate SR increases, the torque T transmittable by traction increases up to the maximum torque $T_{max}$ indicated by a maximum value LM, and then decreases.

The planetary roller set 25 of this embodiment is set to operate in the elasticity region ER. In the elasticity region ER, only the rollers 13, 5, and 8 of the planetary roller set 25 transmit the torque T between the input and output shafts 1 and 15. The elasticity region ER, therefore, corresponds to the low torque range, where the planetary roller set 25 transmits low torque that is within a traction driving torque range DR.

The exceptional steering operation is performed in the high torque range, where the steering angle is large, typically when steering largely at parking or very slow moving.

In the high torque range, the inputted high steering torque is transmitted from the steering wheel 17 to the variable steering-angle-ratio change mechanism 20 through the upper part 18a of the upper steering shaft 18, thereby rotating the sun roller 13 and the sun teethed wheel 12 in a steered direction indicated by the arrow A3. This rotation brings the planetary rollers 5 and the planetary teethed wheel 4 to be rotated by the large torque in a direction, indicated by the arrow A5, opposite to the steered direction, which rotates the ring roller 8 and the ring teethed wheel 7 in a direction indicated by the arrow A6, the same direction as the steered direction. Although these rotational directions in the high torque range are the same as those in the low torque range, their torque flows are different between them.

In this high torque range, namely, large slips occur between the rollers 13, 5, and 8, which results in engagements between the sun teethed wheel 12 and the planetary teethed wheels 4 and between the planetary teethed wheels 4 and the ring teethed wheel 7. The torque is, therefore, transmitted mainly by the planetary teethed wheel set 26 in the high torque range. An arrow A7 indicates a main torque flow between the sun teethed wheel 12 and the planetary teethed wheel 4, which is different from the torque flow in the low torque range.

Figure 6:
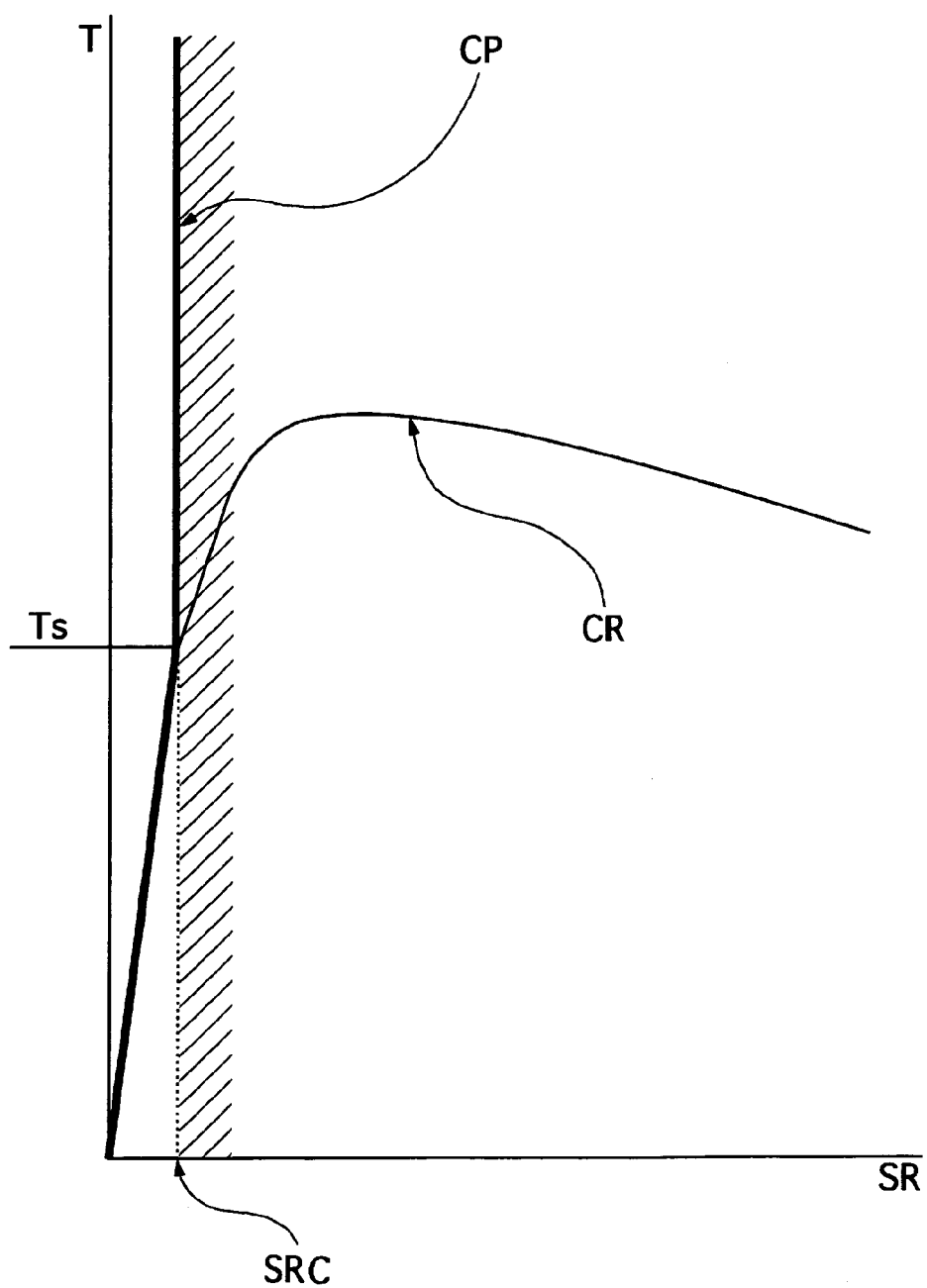
FIG. 6 is a diagram showing a relationship between the slip ratio of the rollers and torque transmittable by the rollers and the teethed wheels.

As shown in FIG. 6, in the high torque range where the planetary teethed wheel set 26 transmits the torque T between the input and output shafts 1 and 15, the slip rate is kept at a point SRC where the planetary teethed wheel set 26 starts to transmit the torque, and a torque transmitting torque characteristic of the planetary teethed wheel set 26 is shown by a line CP. Therefore, the transmitting torque T in the high torque range is equal to or larger than a torque value $T_S$, corresponding to the maximum value of the torque transmitted by the planetary roller set 25, shown in FIG. 6.

When a direction of the transmitting torque changes during torque transmitting by the planetary teethed wheel set 26, the rollers of the planetary roll set 25 transmits torque in its transit phase, ensuring torque transmission and parallelism of the teethed wheels of the planetary teethed wheel set 26.

The steering system with the speed change device of the first embodiment has the following advantages.

(1) The variable steering-angle-ratio change mechanism 20 has the planetary roller set 25 and the planetary teethed wheel set 26 that are arranged in parallel to each other. The rollers transmit low torque smoothly in the normal steering operation, which gives a driver a smooth steering felling. The teethed wheels transmit high torque in the exceptional steering operation, which ensures high-torque transmission.

(2) The planetary roller set 25 and the planetary teethed wheel set 26 enables the input and output shafts 1 and 15 to be arranged in coaxial with each other, with obtaining a fixed speed-down ratio, a fixed speed-up ratio, and a variable speed ratio.

(3) The clearance on the pitch circle of the adjacent teeth of the sun teethed wheel 12 and the planetary teethed wheels 4 is set larger than the slip amount of the rollers 13 and 5 in the low torque range generated in the normal steering operation, which provides non-backlash torque-transmission, giving smooth steering feeling and calm steering operation.

(4) The variable steering-angle-ratio change mechanism 20 has the sun roller 13 with the sun teethed wheel 12 connected with the input shaft 1 and the planetary carrier 3 connected with the output shaft 15, which provides a speed-down ratio, suitable for a variable steering-angle-ratio change mechanism of a steering system. The ring roller 8 with the ring teethed wheel 7 is connected with the motor 27, which provides a simple structure, easy for its assembly.

(5) The motor 27 is provided with the worm 11 in mesh with the worm wheel 10 connected with the ring roller 8 with the ring teethed wheel 7, which enables the variable steering-angle-ratio change mechanism 20 to change its transmission ratio by controlling the motor 27 and fix the transmission ratio by stopping the motor 27.

Next, a steering system with a speed change device of a second embodiment according to the present invention will be described with reference to the accompanying drawings of FIG. 7 and FIG. 8.

Figure 7:
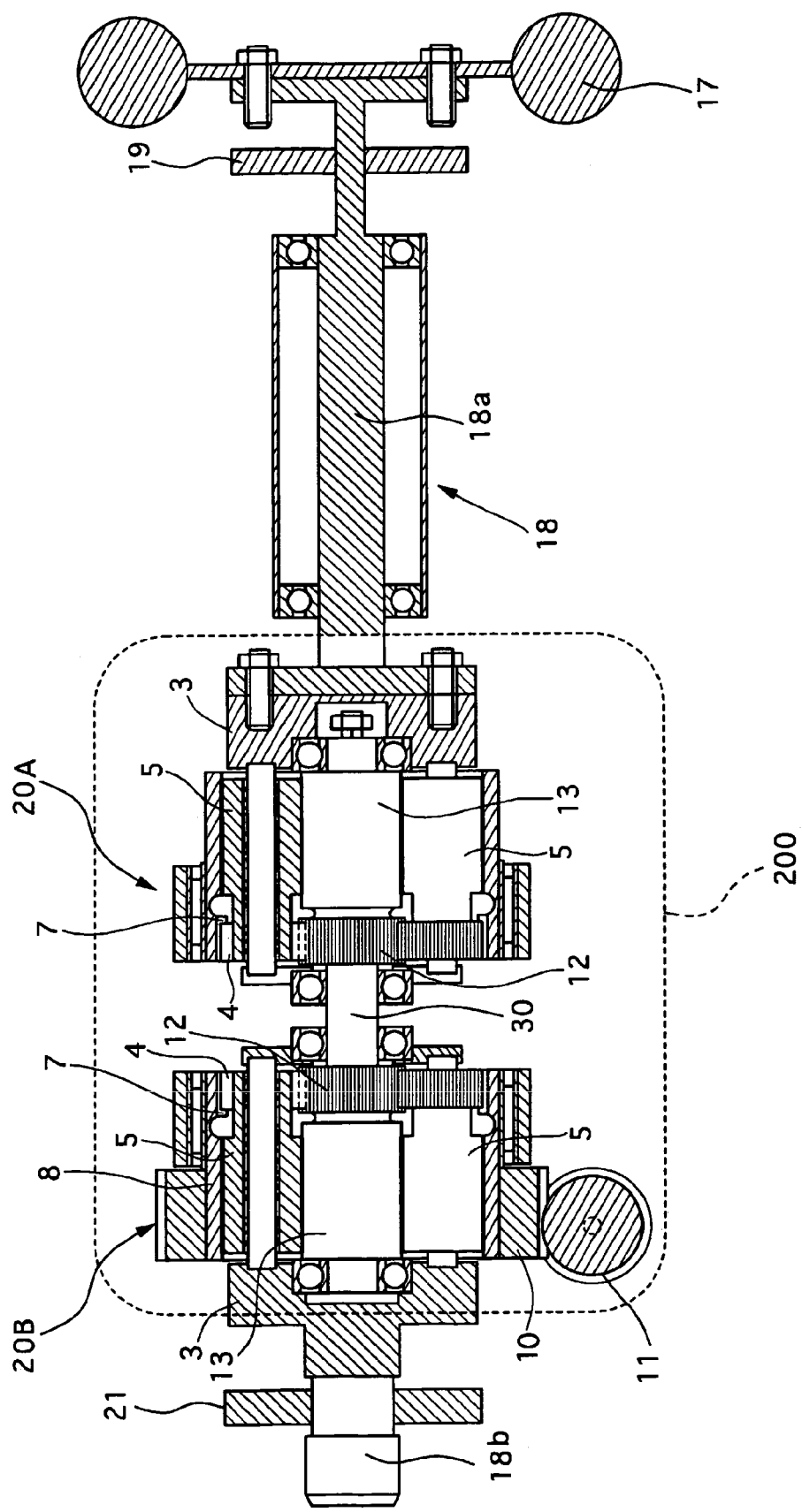
FIG. 7 is a cross sectional view showing a steering system with a speed change device according to a second embodiment of the present invention.

This steering system, as shown in FIG. 7, has a speed change device 200 that is disposed between an upper part 18a and a lower part 18b of an upper steering shaft 18 and has a first variable angle ratio mechanism 20A and a second variable steering angle ratio mechanism 20B, each of which is constructed in the same structure of the variable steering angle ratio mechanism 20 of the first embodiment shown in FIG. 2.

Figure 8:
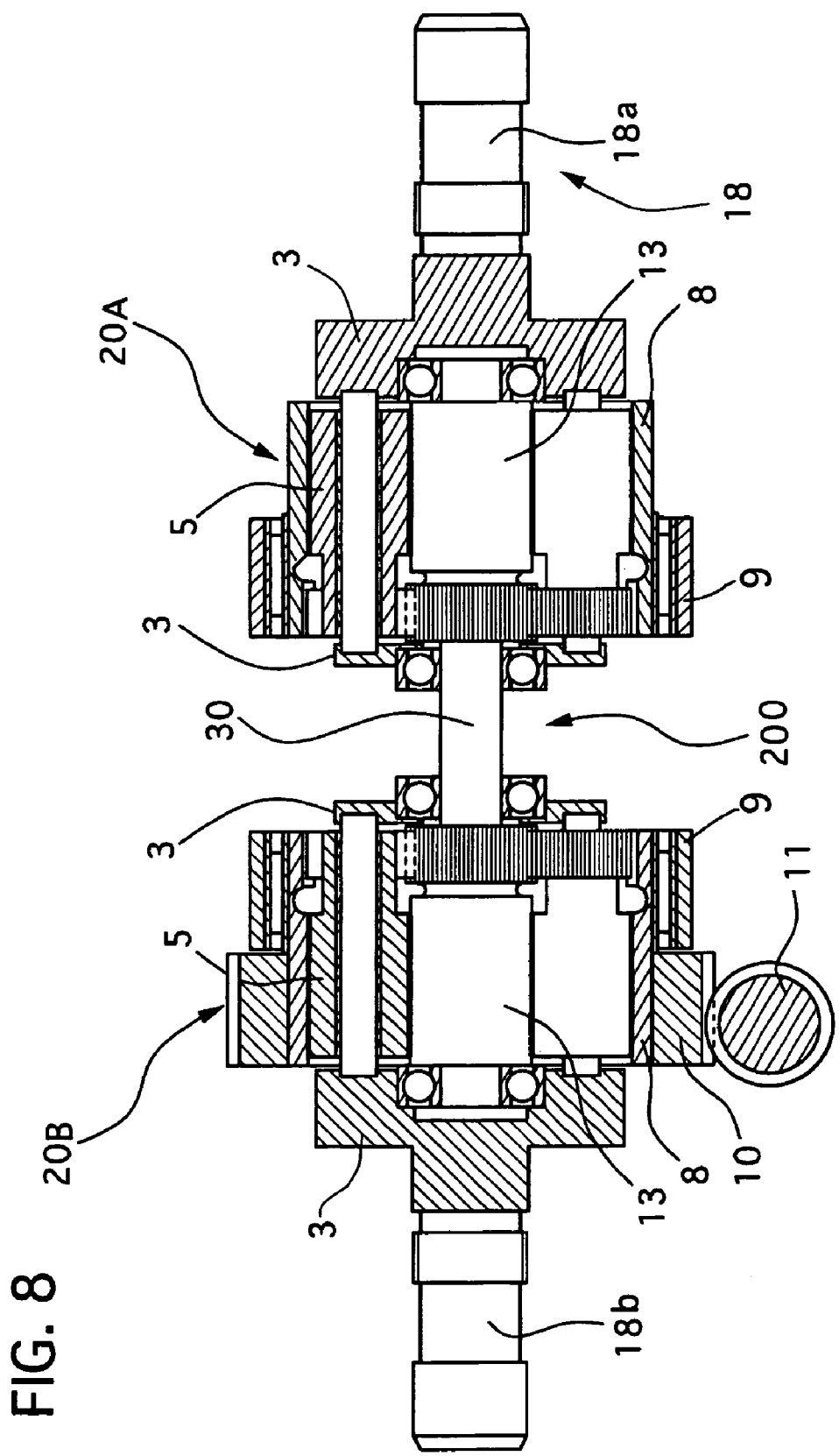
FIG. 8 is an enlarged cross sectional view of the speed change device used in the steering system shown in FIG. 7.

FIG. 8 shows the speed change device 200 adopted in the steering system shown in FIG. 7. This speed change device 200 includes the first and second variable steering angle ratio mechanisms 20A and 20B, which are arranged symmetrically to each other: the first mechanism 20A is arranged in a direction opposite to that of the first embodiment, while the second mechanism 20B is arranged in the same direction as that of the first embodiment. The first and second mechanisms 20A and 20B have a planetary roller set and a planetary teethed wheel set so that a roller element of the roller set is integrally formed with a teethed wheel element of the teethed wheel set like a construction shown in FIG. 2. A planetary carrier 3 of the first mechanism 20A is connected with an upper part 18a of an upper steering shaft 18, while a planetary carrier 3 of the second mechanism 20B is connected with the lower part 18b of the upper steering shaft 18. Sun rollers 13 and 13 of the first and second mechanisms 20A and 20B are connected with each other by a connecting shaft 30. The first mechanism 20A eliminates worm gears, while the second mechanism 20B is equipped worm gears consisting of a worm wheel 10 fixed on an outer periphery surface of a ring roller 8 and a worm 11 engage with the worm wheel 10 and driven by an electric motor. A ring roller 8 of the first mechanism 20A is rotatably supported by an outer race 9. The other parts are similar to those of the first embodiment.

The operation of the steering system with the speed change device 200 of the second embodiment is as follows.

The input torque from a steering wheel 17 is transmitted to the planetary carrier 3 of the first mechanism 20A through the upper part 18a of the upper steering shaft 18, and then the sun roller 13 of the second mechanism 20B through the sun rollers 13 of the first mechanism 20A and the connecting shaft 30. The planetary carrier 13 of the second mechanism 20B outputs the torque to the lower part 18b of the upper steering shaft 18, and thereby steering front wheels through a lower steering shaft and a steering gears/linkage.

When the motor is stopped, the ring roller 8 of the second mechanism 20B is held. In this state, the rotation speed of the upper part 18a of the upper steering shaft 18 is increased by the first mechanism 20A, and then decreased by the second mechanism 20B so that rotation speeds of the upper part 18a and the lower part 18b become equal to each other, thereby a transmission ratio is one. Note that in this speed change device 200 the first and second mechanisms 20A and 20B transmits steering torque by their planetary roller sets in a low torque range and by their planetary teethed wheel sets in a high torque range, similarly to those of the first embodiment.

The steering system with the speed change device 200 of the second embodiment has the following advantages in addition to the advantages (1), (2), (3), and (5) of the first embodiment.

(6) The speed change device 200 of the steering system can control its output angle arbitrarily with respect to a steering angle inputted from the steering wheel 17 by controlling the motor. When the motor is stopped, an input angle and an output angle become equal to each other.

Figure 9:
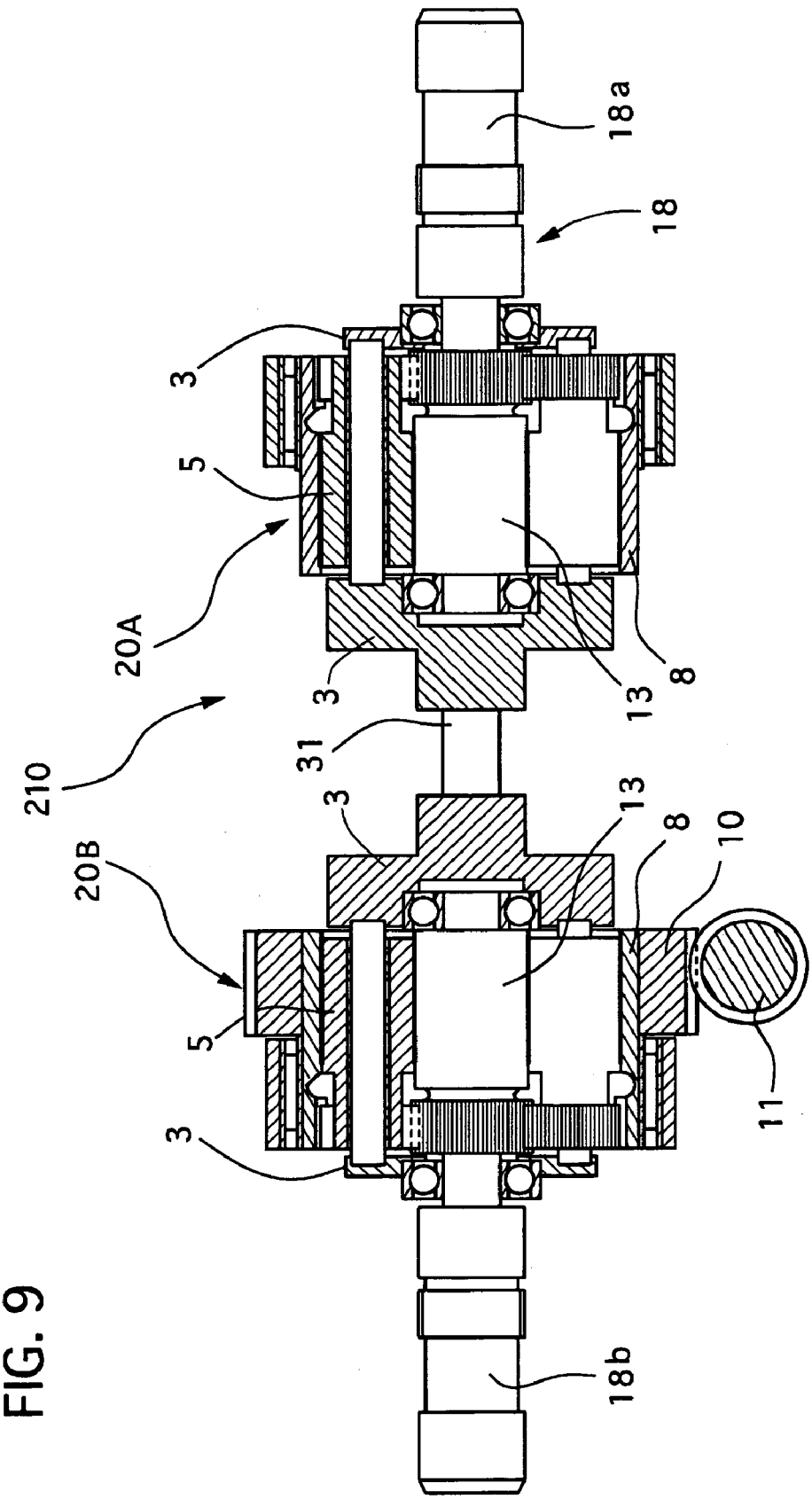
FIG. 9 is a cross sectional view showing a speed change device according to a third embodiment of the present invention.

Next, a steering system with a speed change device according to a third embodiment of the present invention will be described with reference to the accompanying drawing of FIG. 9.

This steering system, not shown, is similar to that of the second embodiment shown in FIG. 7, and has a speed change device 210 consisting of a first steering angle ratio mechanism 20A and a second variable steering angle ratio mechanism 20B that are arranged in a direction opposite to those of the second embodiment. The mechanism 20A and 20B have a planetary roller set and a planetary teethed wheel set so that a roller element of the roller set is integrally formed with a teethed wheel element of the teethed wheel set like a construction shown in FIG. 2.

A sun roller 13 of the first mechanism 20A is connected with an upper part 18a of an upper steering shaft 18, and a planetary carrier 3 thereof is connected with a planetary carrier 3 of the second mechanism 20B through a connecting shaft 31. The sun roller 13 of the second mechanism 20B is connected with a lower part 18b of the upper steering shaft 18. The other parts are similar to those of the second embodiments shown in FIG. 8.

The operation of the steering system with the speed change device 200 is as follows.

The input torque inputted from a steering wheel through the upper part 18a of the upper steering shaft 18 is transmitted to the sun roller 13 of the first mechanism 20A, and then to a planetary carrier thereof through planetary rollers 5. The planetary carrier 3 of the first mechanism 20A drives a planetary carrier 3 of the second mechanism 20B through the connecting shaft 31, thereby rotating planetary rollers 5 and the sun roller 13 to transmit the steering torque to the lower part 18b of the upper steering shaft 18. Note that in this speed change device 210 the first and second mechanisms 20A and 20B transmits steering torque by their planetary roller sets in a low torque range and by their planetary teethed wheel sets in a high torque range, similarly to those of the first embodiment.

When the motor is stopped to held a ring roller 8 of the second mechanism 20B, the input steering angle from the steering wheel 17 is reduced by the first mechanism 20A, and then increased by the second mechanism 20B, so that the input and output steering angle become equal to each other.

The steering system with the speed change device 210 of the third embodiment has the following advantages in addition to the advantages (1), (2), (3), and (5) of the first embodiment.

(7) The speed change device 210 of the steering system can control its output angle arbitrarily with respect to a steering angle inputted from the steering wheel 17 by controlling the motor. When the motor is stopped, an input angle and an output angle become equal to each other.

Figure 10:
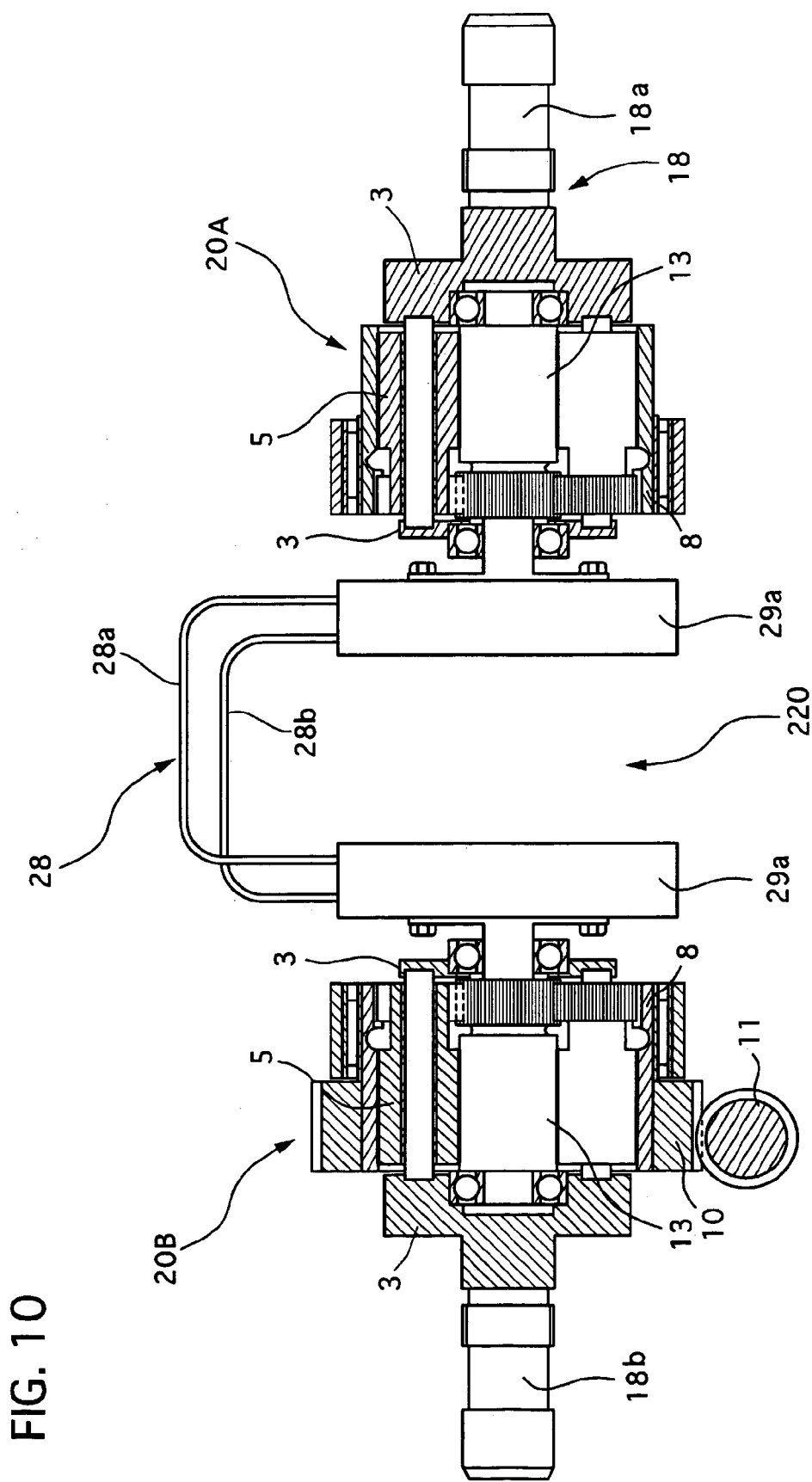
FIG. 10 is a cross sectional view showing a speed change device according to a fourth embodiment of the present invention.

Next, a steering system with a speed change device according to a fourth embodiment of the present invention will be described with reference to the accompanying drawing of FIG. 10.

This steering system, not shown, is similar to that of the second embodiment shown in FIG. 7, and has a speed change device 220 that is disposed between an upper part 18a and a lower part 18b of an upper steering shaft 18 and has a first variable steering angle ratio mechanism 20A and a second variable steering angle ratio mechanism 20B that are arranged in a direction opposite to those of the second embodiment. The mechanisms 20A and 20B have a planetary roller set and a planetary teethed wheel set so that a roller element of the roller set is integrally formed with a teethed wheel element of the teethed wheel set like a construction shown in FIG. 2. A planetary carrier 3 of the first mechanism 20A is connected with an upper part 18a of an upper steering shaft 18, and a planetary carrier 3 of the second mechanism 20B is connected with a lower part 18b of the upper steering shaft 18. Cable columns 29a and 29a are attached to sun rollers 13 and 13 of the firs and second mechanism 20A and 20B, respectively. The cable columns 29a and 29a are connected with each other by a control cable 28 having a first cable 28a and a second cable 28b so as to transmit steering torque therebetween. Preferably, load acting on the control cable 28 is set to be as smaller as possible for ensuring its durability. The other parts are similar to those of the second embodiment shown in FIG. 8.

The operation of the steering system with the speed change device 220 is as follows.

The input torque from a steering wheel is transmitted to the planetary carrier 3 of the first mechanism 20A through the upper part 18a of the upper steering shaft 18, and then to the sun roller 13 of the second mechanism 20B through the control cable 28. The planetary carrier 3 of the second mechanism 20B outputs the steering torque to the lower part 18b of the upper steering shaft 18, and then to front wheels through a lower steering shaft and a steering gears/linkage.

This steering system with the speed change device 200 has the following advantage in addition to the advantages (1), (2), (3), and (5) of the first embodiment and the advantage (6) of the second embodiment.

(8) The first and second variable steering angle ratio mechanisms 20A and 20B are connected by the control cable 28, which brings design freedom for their arrangement in a motor vehicle to be extended, and enables the load acting on the control cable 28 to be smaller, resulting in an improvement in durability of the control cable 28.

Figure 11:
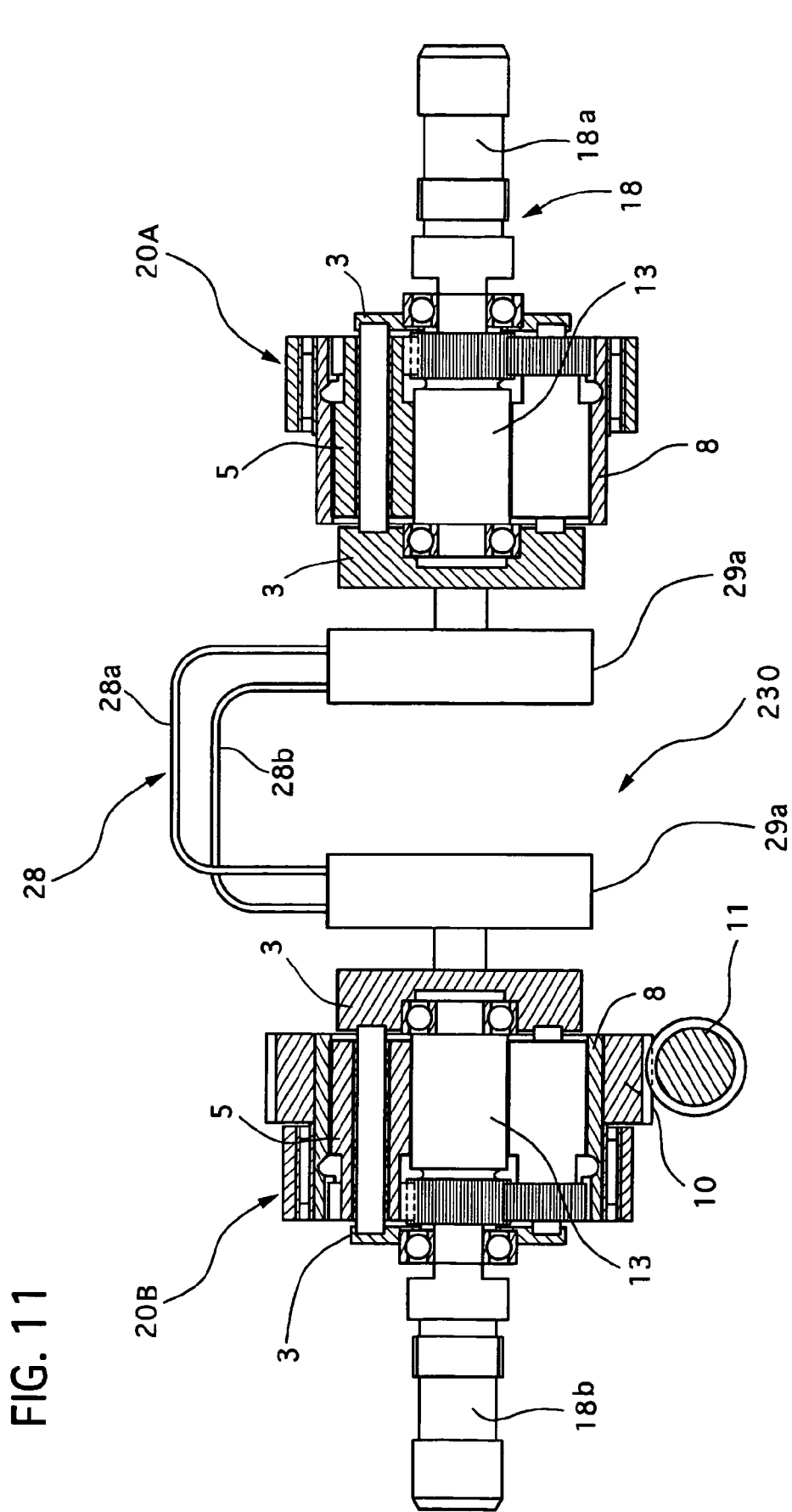
FIG. 11 is a cross sectional view showing a speed change device according to a fifth embodiment of the present invention.

Next, a steering system with a speed change device of a fifth embodiment of the present invention will be described with reference to the accompanying drawing of FIG. 11.

This steering system, not shown, is similar to that of the second embodiment shown in FIG. 7, and has the speed change device 200 consisting of a first variable steering angle ratio mechanism 20A and a second variable steering angle ratio mechanism 20B that are arranged in a direction opposite to those of the second embodiment. The mechanisms 20A and 20B have a planetary roller set and a planetary teethed wheel set so that a roller element of the roller set is integrally formed with a teethed wheel element of the teethed wheel set like a construction shown in FIG. 2. A sun roller 13 of the first mechanism 20A is connected with an upper part 18a of an upper steering shaft 18a, and a sun roller 13 of the second mechanism 20B is connected with a lower part 18b of the upper steering shaft 18. Cable columns 29a and 29a are fixed to planetary carrier 3 and 3, and connected by a control cable 28 having a first cable 28a and a second cable 28b so as to transmit steering torque therebetween.

The operation of the steering system with the speed change device 230 is as follows.

The input torque from a steering wheel is transmitted to the sun carrier 13 of the first mechanism 20A through the upper part 18a of the upper steering shaft 18, and then to the planetary carrier 3 of the second mechanism 20B through the control cable 28. The sun roller 13 of the second mechanism 20B outputs the steering torque to the lower part 18b of the upper steering shaft 18, and then to front wheels through a lower steering shaft and a steering gears/linkage.

This steering system with the speed change device 230 has the following advantage in addition to the advantages (1), (2), (3), and (5) of the first embodiment and the advantage (7) of the third embodiment.

(9) The first and second variable steering angle ratio mechanisms 20A and 20B are connected by the control cable 28, which brings design freedom for their arrangement in a motor vehicle to be extended. In addition, this speed change device 230 enables the movement amount of the control cable 28 to be shorter than that of the fourth embodiment, because the first mechanism 20A decreases the inputted steering angle. This reduces sliding resistance of the control cable 28, thereby improving durability of the control cable 28.

Figure 12A:
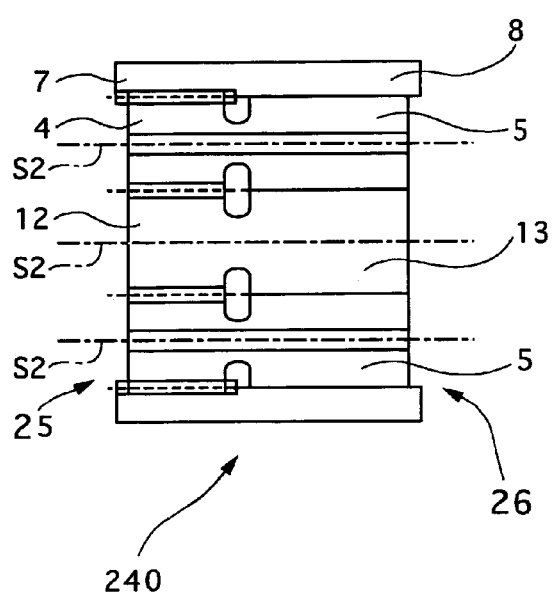
FIG. 12A is a cross sectional view showing a speed change device according to a sixth embodiment of the present invention.
Figure 12B:
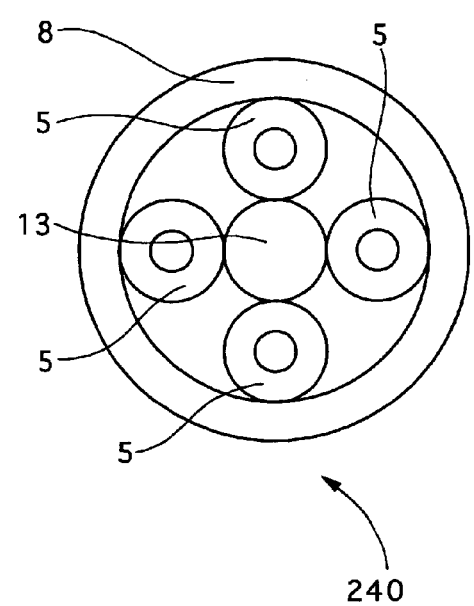
FIG. 12B is a front view of the speed change device of the sixth embodiment.

Next, a speed change device 240 according to a sixth embodiment of the present invention will be described with reference to the accompanying drawings of FIGS. 12A and 12B.

The speed change device 240 is disposed between an input member and an output member of a torque transmitting system. It has a planetary roller set 20A and a planetary teethed wheel set 26 that include a sun roller 13 integrally formed with a sun teethed wheel 12, planetary rollers 5 integrally and respectively formed with planetary teethed wheels 4, a ring roller 8 integrally formed with a ring teethed wheel 7, and a planetary carrier, not shown, rotatably supporting the planetary rollers 5 and the planetary teethed wheels 4. The planetary rollers 5 contact with the sun roller 13 and the ring roller 8, while the planetary teethed wheels 4 are engageable with the sun teethed wheel 12 and the ring teethed wheel 7.

The operation of the speed change device 240 of the sixth embodiment is as follows.

Figure 13:
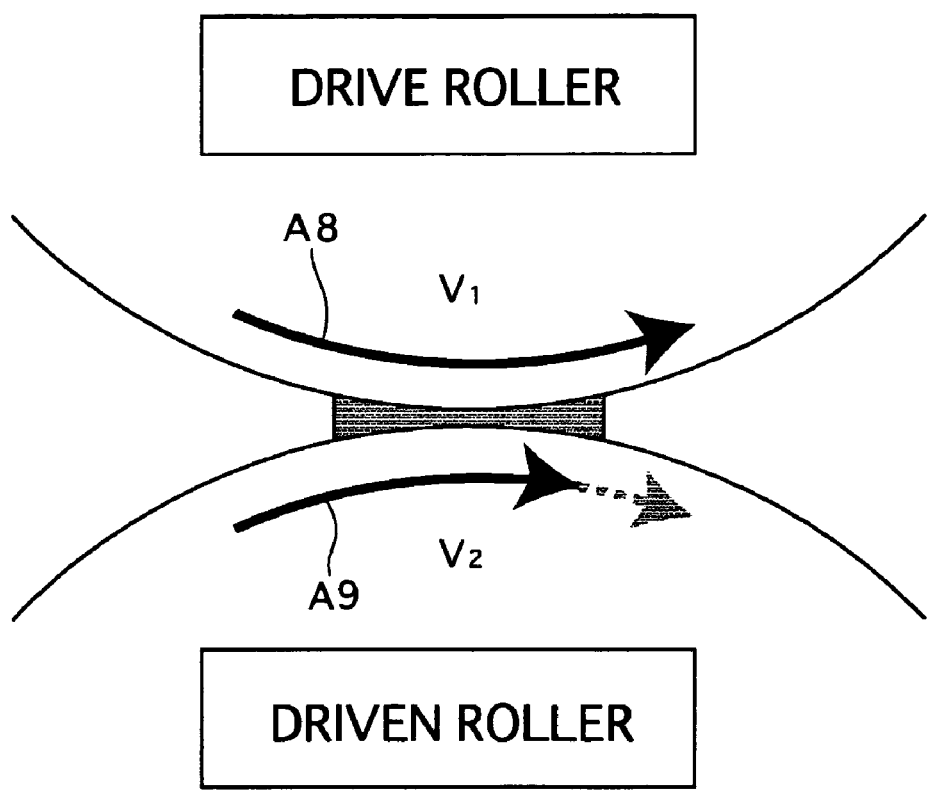
FIG. 13 is a schematic diagram illustrating a torque transmitting state of rollers of a speed change device.

In a planetary roller set, as shown in FIG. 13, traction is obtained by shearing stress of oil film generated between a drive roller connected with the input member and a driven roller connected with the output member based on speed difference on their surfaces. In FIG. 13, the drive roller rotates in the counterclockwise direction indicted by an arrow A8, and the driven roller rotates in the clockwise direction indicated by an arrow A9.

The slip rate α between the rollers is defined by the following equation.

$$\alpha = (V_1 - V_2)/V_1 \quad \text{(a)}$$

where $V_1$ is a speed on the surface of the drive roller, and $V_2$ is a speed on the surface of the driven roller.

Figure 14:
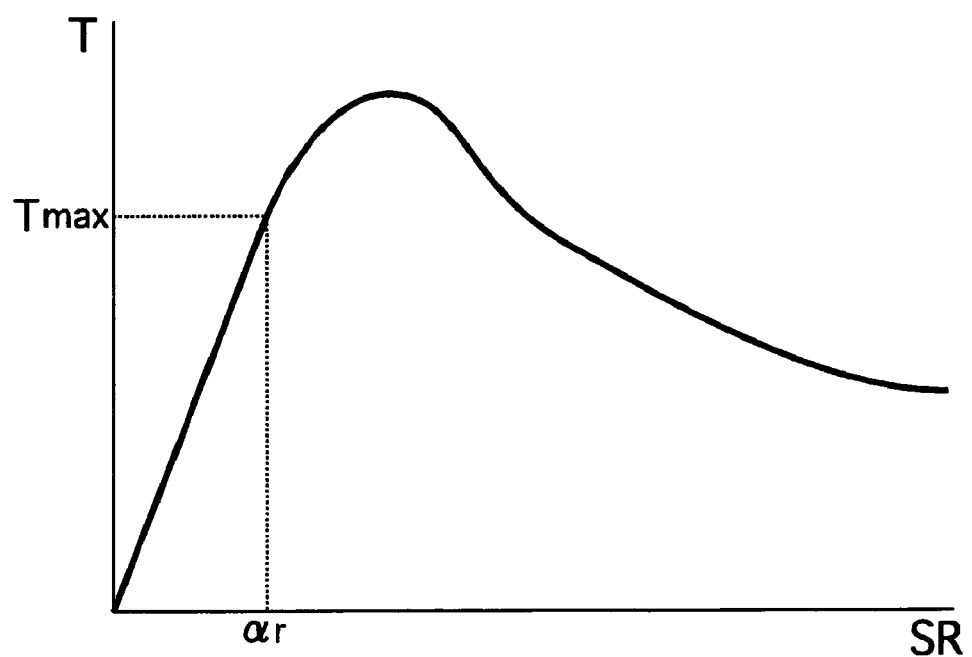
FIG. 14 is a diagram showing a relationship between a slip ratio of the rollers and torque transmittable by the rollers.

FIG. 14 shows a relationship between the slip rate SR of the rollers with the teethed wheel and transmittable torque T. The relationship therebetween becomes approximately linear in a slip rate range from zero to $\alpha_r$. This slip rate $\alpha_r$ is a slip rate where rating torque is obtained.

Figure 16A:
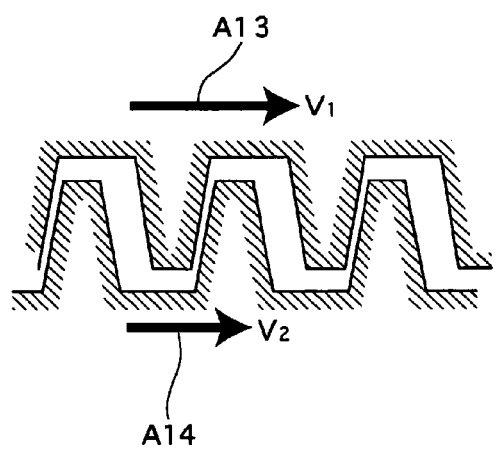
FIG. 16A and FIG. 16B are schematic diagrams showing relationship between on-pitch-circle velocities of the drive and driven teethed wheels.
Figure 16B:
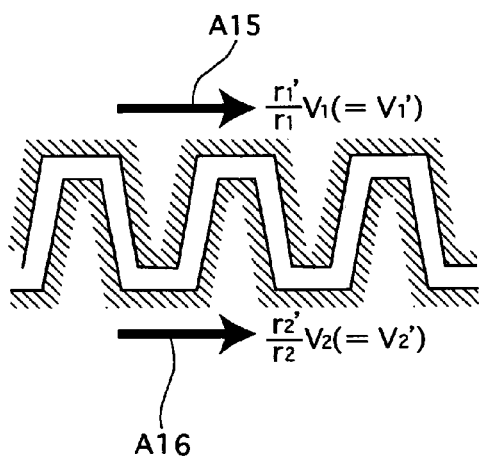

Velocities $V_1'$ and $V_2'$ on the pitch circle of a drive and driven teethed wheels respectively connected with the drive roller and the driven roller can be expressed by the following equations.

$$V_1' = (r_1'/r_1)V_1 \quad \text{(b)}$$

$$V_2' = (r_2'/R_2)V_2 \quad \text{(c)}$$

where $r_1$ and $r_2$ are radiuses of the drive and driven rollers, respectively, $r_1'$ and $r_2'$ are pith radiuses of the drive and driven teethed wheels, respectively. FIG. 16A and FIG. 16B show this rotating states of the rollers and the teethed wheels, respectively, where the velocity $V_1$ of the drive roller is indicated by an arrow A13, the velocity V2 of the driven roller is indicated by an arrow A14, the velocity $V_1'$ of the drive teethed wheel is indicated by an arrow A15, and the velocity $V_2'$ of the driven teethed wheel is indicated by an arrow A16.

Outer radiuses of the rollers and pitch radiuses of the teethed wheels are set, using the equations (b) and (c), so that they satisfy the following equation (d) and the equation $V_1' = V_2'$.

$$r_1' r_2 / r_1 r_2' = 1 - \alpha_k \quad \text{(d)}$$

This slip rate $\alpha_k$ is the slip rate where no slip occurs between the teethed wheels, and obtained under the condition that the transmitting torque is equal to and less than the rating torque $T_{max}$.

Therefore, the slip rate $\alpha_k$ can be expressed by the following equation.

$$0 < \alpha_k < \alpha_r \qquad (e)$$

As the slip rate $\alpha_k$ becomes smaller, velocity on the pitch circle of the drive teethed wheel becomes smaller than that of the driven teethed wheel, resulting in a phase delay of the driven teethed wheel with respect to the driven teethed wheel. Conversely, as a slip rate is larger than the slip rate $\alpha_k$, velocity on the pitch circle of the drive teethed wheel becomes larger than that of the driven teethed wheel, resulting in a phase advance. This means that the drive roller rotates forward and backward with respect to the driven wheel around the slip rate $\alpha_k$, the drive teethed wheel rotates forward and backward with respect to the driven teethed wheel around their initial position.

Next, a steering system with the speed change device 240 will be described.

The steering system is inputted by input steering torque from a steering wheel and a reaction torque from a road. The input steering torque can be assumed to be a main driving source of the system, because the input steering torque and steering angle speed that are inputted from the steering wheel are larger than those inputted from the road. From the equations (b) to (e), a pitch radius of the teethed wheel connected with the steering wheel is set smaller than an outer radius of the roller connected with the steering wheel. In addition, a pitch radius of the teethed wheel connected with steering gears is set larger than an outer radius of the roller connected with the steering gears.

Figure 17:
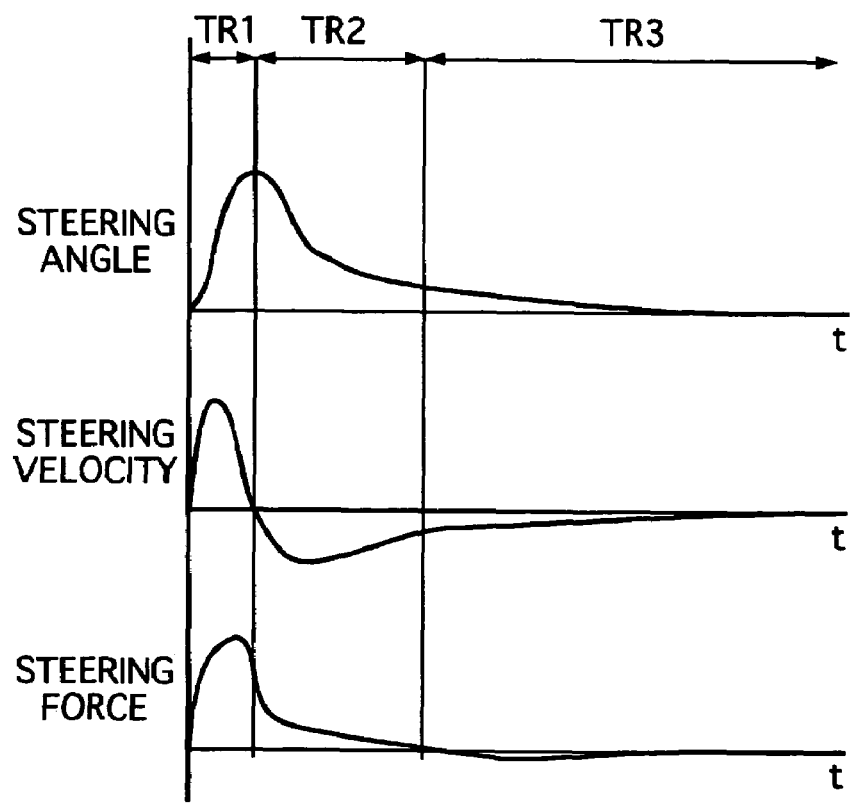
FIG. 17 is a diagram showing relationships among a steering angle, steering velocity, and steering force when a driver operates a steering wheel (a steering force inputting period) and then brings it back (a steering-wheel bringing-back period)

FIG. 17 shows steering behavior when a driver operates the steering wheel and then decreases steering force by using reaction force from a road so as to run the vehicle straight.

When the driver operates the steering wheel in a steering force inputting period TR1, the steering angle and the steering force increase gradually and the steering velocity becomes zero at the maximum steering angle. Then, the driver brings back the steering wheel by reducing the steering force and using the reaction force from the road in a steering-wheel bringing-back period TR2, causing the steering velocity to be negative and increase its amount, then decreasing slowly up to zero. In this bringing-back period, the driver applies certain steering force to receive the reaction force, and decreases the steering force with the reaction force as front wheels turn straight. In a compensating period TR3 where the reaction force becomes very small, the driver applies the steering force in the negative direction so as to turn the front wheels straight.

Figure 18:
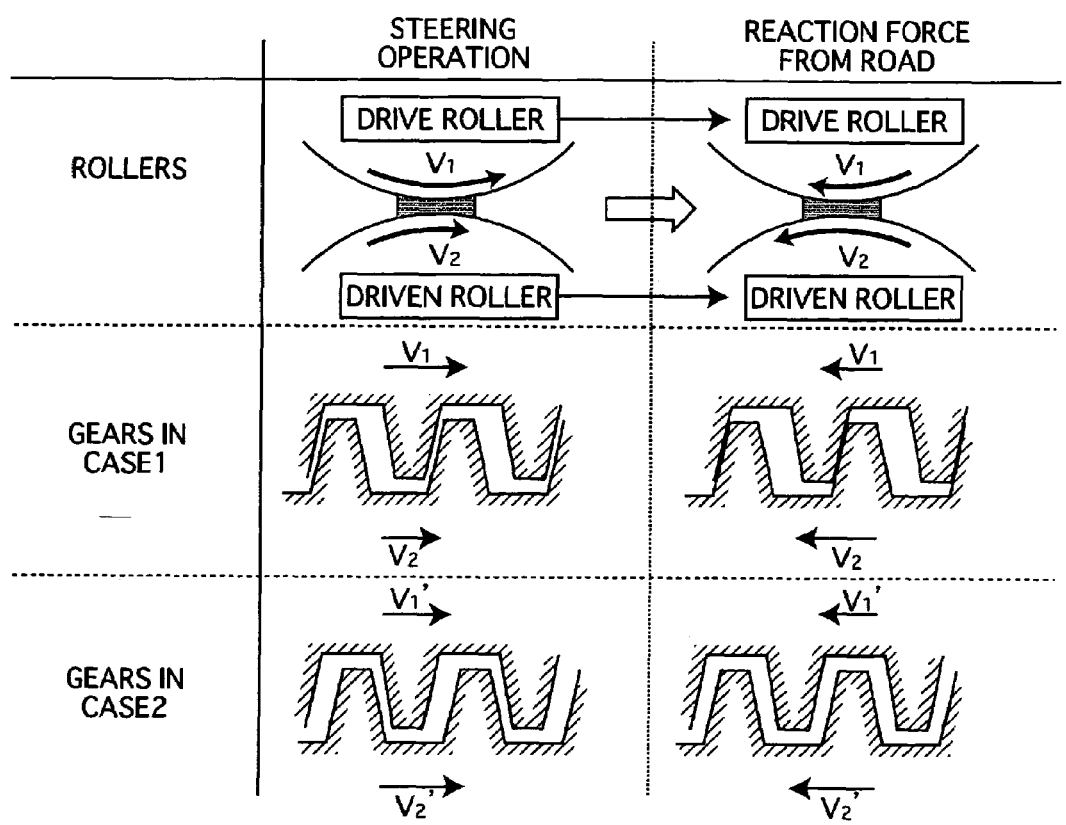
FIG. 18 is a schematic diagram illustrating phase lags of teeth of the teethed wheels in the steering force inputting period and in the steering-wheel bringing-back period, respectively.

When the steering state changes from the period TR1 to the steering force inputting period to the steering-wheel bringing-back period TR as shown in FIG. 7, rotational directions and relation of the drive and driven are changed adversely with each other as shown in FIG. 18. The left half part of FIG. 18 shows a steering state in the period TR1, and the right half part of FIG. 18 shows a steering state in the period TR2. Accordingly, the speed rate $\alpha_k$ is set within a boundary region from zero to the slip rate $\alpha_r$, so that a probability of the engagement of the teethed wheels can be limited to a low level during the steering-wheel bringing-back period TR2.

The phase lag between the teeth wheels is expressed by the following equation by using steering force and steering velocity.

$$\theta(t) = \int K_{TR}(T(\tau) \cdot |\omega(\tau) - T_k \cdot \omega(\tau)) d\tau | \qquad (f)$$

where $K_{TR} = C_{TR} \times \alpha_r / T_{max}$, $C_{TR}$ is an input—sun teethed wheel overdrive ratio, $T_{max}$ is the rating torque, and $T_k$ is a transmitting torque at the slip rate $\alpha_k$.

The probability of the engagement of the teethed wheels can be minimized in a normal steering range, by setting the slip rate appropriately based on the distribution of steering force and steering velocity when the vehicle running.

Figure 19:
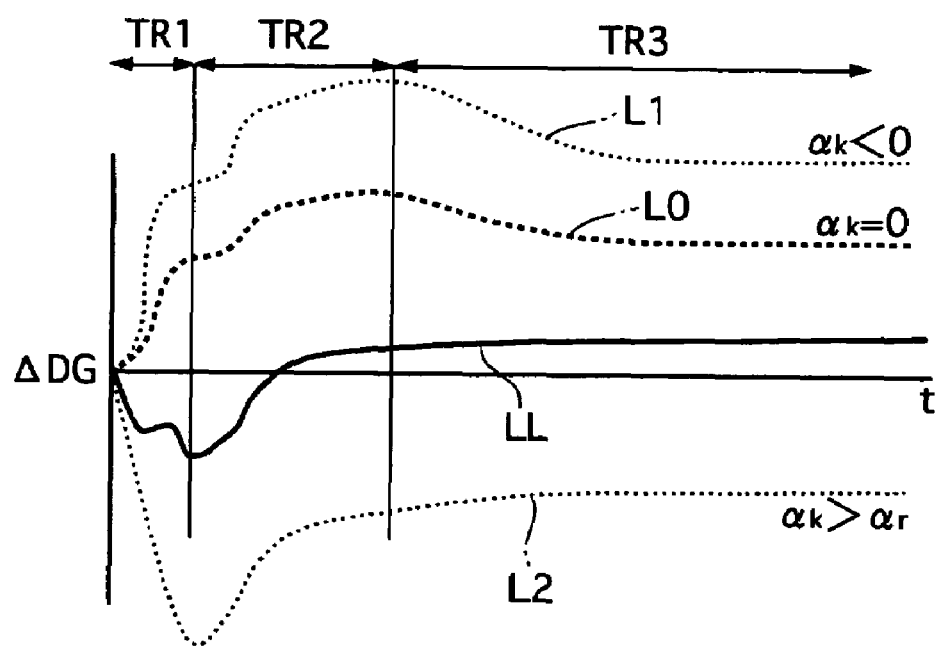
FIG. 19 is a time chart showing the phase lags of the teethed wheels at different slip rates of the rollers.

FIG. 19 shows a time chart of phase lags $\Delta$DG between the teethed wheels when the slip rate is set to vary: $\alpha_k < 0$, $\alpha_k = 0$, and $\alpha_k > \alpha_r$. A line L1 indicates the phase lag $\Delta$DG at $\alpha_k 21$ 0, a line L0 indicates the phase lag $\Delta$DG at $\alpha_k = 0$, a line L2 indicates the phase lag $\Delta$DG at $\alpha_k > \alpha_r$, a line LL indicates the time lag $\Delta$DG at the appropriate slip rate set in the seed change device of the embodiment, and "t" indicates time. The speed change device of the embodiment has the following characteristics and advantages.

In the steering force inputting period TR1, the phase lag between the teethed wheels causes in a negative direction in the speed change device in which the outer radius of the rollers and the pitch radius of the teethed wheels are set appropriately with compared to a speed change device in which the outer radius of the rollers is set equal to the pitch radius of the teethed wheels. In the steering-wheel bringing-back period TR2, the positive phase lag occurs between the teethed wheels, which move toward the initial position. In the compensating period TR3, the phase lag increases little by little, because the steering velocity is low. The direction of the phase lag is changed based on a balance between the steering force and the resistance force, which enables the peak of the phase lag to be kept at a low level. Compared to this device, when the slip rate $\alpha_k$ is set smaller than zero, the phase lag becomes larger than that at the slip rate $\alpha_k$ of zero in a wide range. When the slip rate $\alpha_k$ is set larger than $\alpha_r$, the direction of the phase lag becomes to be negative in the entire range, resulting in the engagement of the teethed wheels. Therefore, the phase lag can be limited to a low level with decreasing the probability of the engagement of the teethed wheels by adequate setting of the ratio between the outer radiuses of the rollers and the pitch radiuses of the teethed wheels.

Figure 20A:
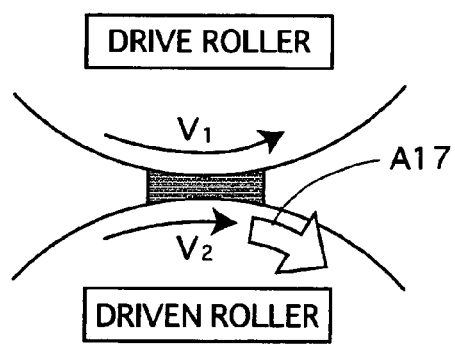
FIG. 20A and FIG. 20B are schematic diagrams showing behaviors of the rollers when the teethed wheels engage with each other in the steering force inputting period and in the steering-wheel bringing-back period, respectively.
Figure 20B:
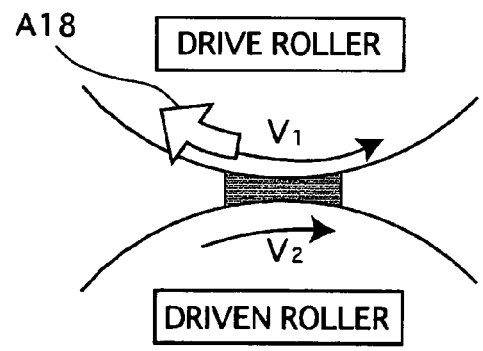

FIG. 20A and FIG. 20B show behaviors of the rollers when the teethed wheels engage with each other in the steering force inputting period TR1 and in the steering-wheel bringing-back period TR2, respectively. In this state, the velocities $V_1'$ and $V_2'$ of the teethed wheels are equal to each other: $V_1' = V_2'$.

The velocity $V_2$ at the outer surface of the roller, corresponding to the drive roller in the period TR1 shown in FIG. 20A and to the drive roller in the period TR2 shown in FIG. 20B, is expressed by the following equation.

$$V_2 = (1 - \alpha_k) V_1 \qquad (g)$$

In this engagement state of the teethed wheels, the velocity difference between the rollers is kept according to the equation (g). When the steering wheel is the driving source, the rollers transmit torque $T_k$ due to the velocity difference, and torque exceeding $T_k$ is transmitted by the teethed wheels.

When the inputted steering torque is equal to or less than $T_k$, the direction of the phase lag between the teethed wheels becomes reverse, resulting in the teethed wheels moving apart from each other. This enables the speed change mechanism 240 to transmit the torque by the rollers, so that the driver can operate the steering wheel normally.

Conversely, when the front wheels are the driving source, the torque generated due to the velocity difference between the rollers acts on the steering wheel as reaction torque, causing resistance torque $T_k$ against the inputted reaction torque from the road.

The traction is obtained by shearing stress generated in an oil film between the rollers; in this device, between the sun roller 13 and the planetary rollers 5 and between the planetary rollers 5 and the ring roller 8. The sun roller 13 and the planetary rollers 5 line-contact with each other, while the planetary rollers 5 and the ring roller 8 face-contact with each other. Therefore, oil film formed between the sun roller 13 and the planetary rollers 5 is different in thickness from oil film between the planetary rollers 5 and the ring roller 8, which results in the fact that the traction generated in the former contact is larger than that generated in the latter contact. This means that the slip rate becomes smaller in the slip between the planetary rollers 5 and the ring roller 8 than the slip between the sun roller 13 and the planetary rollers 5.

Accordingly, the phase lag between the sun roller 13 and the planetary rollers 5 determines a phase lag of the planetary roller set for its design.

Namely, the slip rates and the phase lags are different between of the sun roller and the planetary roller and of the ring roller and the planetary rollers, which happens to cause only one of the engagement of the sun teethed wheel and the planetary teethed wheel and the engagement of the ring teethed wheel and the planetary teethed wheel to transmit torque by the wheels. In this engaging state, the rollers connected with the other wheels can transmit torque, which ensures torque transmission between the input and output shafts through the speed change device 240.

The speed change device 240 of the sixth embodiment has the following advantages.

(10) The on-pitch-circle velocity $V_1'$ of the drive teethed wheel always becomes smaller than the on-pitch-circle velocity $V_2'$ of the driven teethed wheel in the low torque range where the rollers transmits the torque between the input and output shafts, which can prevent advance of the phase lag of the teethed wheels and decrease the probability of their engagement.

(11) The outer radiuses $r_1$ and $r_2$ of the rollers, and pitch radiuses $r_1'$ and $r_2'$ of the teethed wheels are set based on the equation (d) with the slip rate $\alpha_k$ of the rollers being within a limited range ($0<\alpha_k<\alpha_r$, where $\alpha_k$ is the slip rate at the rating torque $T_{max}$), which decreases the phase lag of the teethed wheels and probability of their engagement. In addition, the direction of the phase lag between the teethed wheels is reversed when shifting from the steering-force inputting period to the steering-wheel bringing-back period, which reduces the probability of the engagement of the teethed wheels.

(12) Adapting this speed change device 240 to a steering system, the rollers transmit steering torque, which gives a driver a smooth and soft steering operation feeling in a normal steering area. When the large torque higher than the normal steering torque is inputted in an exceptional steering range, such as when the vehicle is stopped and a driver operates the steering wheel to rotate large angle, the teethed wheels can be engaged to transmit the large torque.

Figure 21:
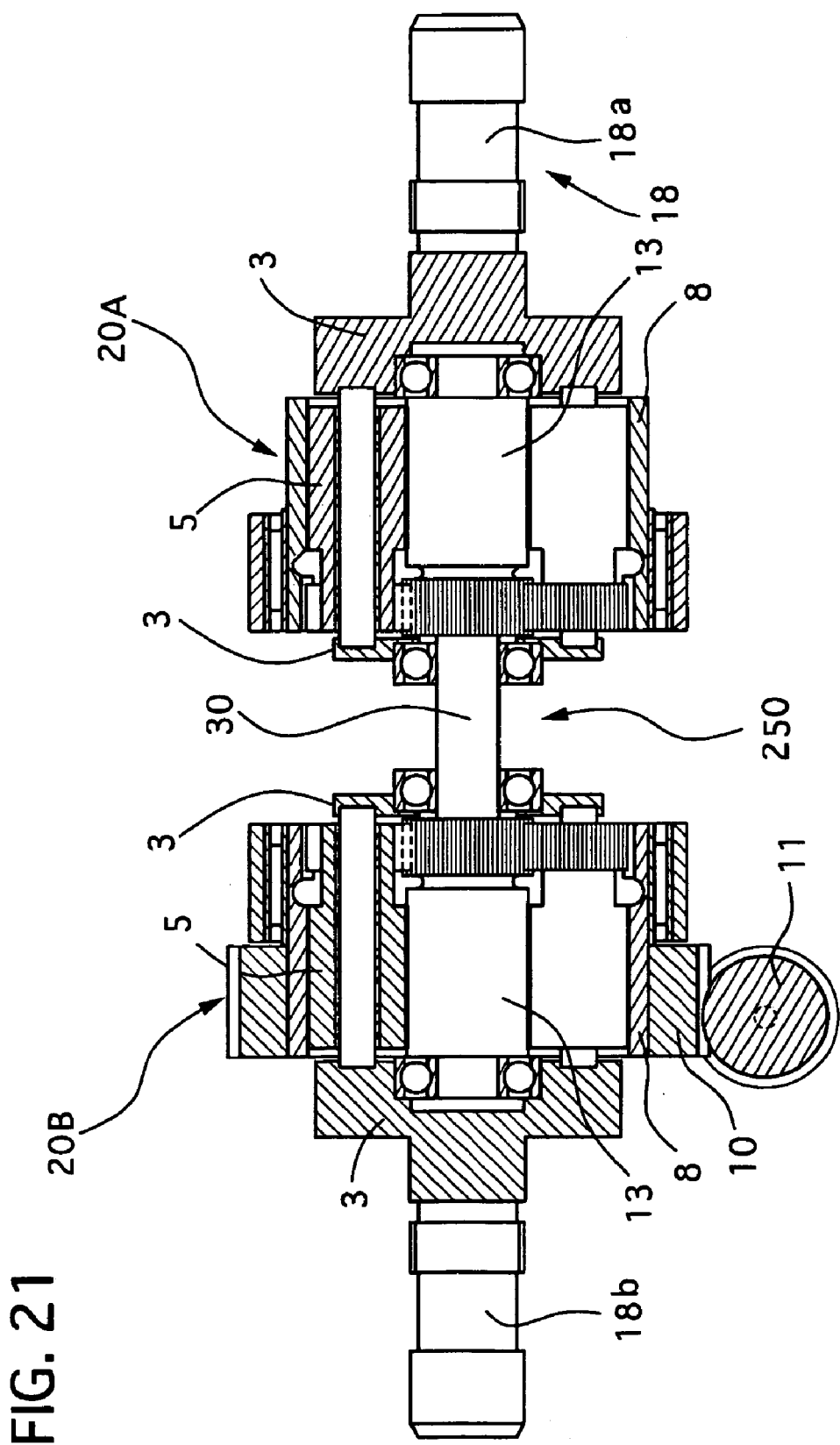
FIG. 21 is a cross sectional view showing a speed change device according to a seventh embodiment of the present invention.

A steering system with a speed change device of a seventh embodiment will be described with reference to the accompanying drawing of FIG. 21.

This steering system, not shown, is similar to that of the second embodiment shown in FIG. 7, and has a speed change device 250 that is disposed between an upper part 18a and a lower part 18b of an upper steering shaft 18 and has a first variable steering angle ratio mechanism 20A and a second variable steering angle ratio mechanism 20B that are arranged in the same direction as those of the second embodiment. The mechanisms 20A and 20B have a planetary roller set and a planetary teethed wheel set so that a roller element of the roller set is integrally formed with a teethed wheel element of the teethed wheel set like a construction shown in FIG. 2.

In this speed change device 250, the second variable steering angle ratio mechanism 20B is constructed so that it has a torque transmitting capacity larger than that of the first variable steering angle ratio mechanism 20A. A radius of a sun roller 13 of the second mechanism 20B, namely, is set larger than that of the first mechanism 20A, and thereby increasing pressing force between the rollers of the second mechanism 20B. The figuration of the second mechanism 20B may be similar to or different from that of the first mechanism 20A.

Specifically, radiuses of the rollers of the first and second mechanisms 20A and 20B are set based on the following equation.

$$T_{max}' = T_{max} \times \beta_1 \tag{h}$$

where $T_{max}'$ is a rating torque of the second mechanism 20B, $T_{max}$ is a rating torque of the first mechanism 20A, and $\beta_1$ is a normal speed-up ratio under a steering ratio control in a speed-up ratio of an electric motor. The normal speed-up ratio $\beta_1$ under the steering control is a speed-up ratio that is used at most frequent intervals when the vehicle running. The steering control is performed by increasing or decreasing the speed-up ratio based on the normal speed-up ratio according to vehicle speed and others so as to change the steering angle ratio.

The operation of the steering system with the speed change device 250 of the seventh embodiment will be described.

As mentioned in the description of the sixth embodiment, slip always occurs between the rollers when they transmit torque, resulting in increase of the phase lag between the drive and driven rollers to engage the teethed wheels. In particular, the phase lag of the mechanism connected with the motor for a steering control becomes larger and their teethed wheels are engaged in advance of the other mechanism.

In order to avoid the above undesirable engagement, the speed change device 250 has the second variable steering angle ratio mechanism 20B with torque-transmitting capacity larger than that of the first variable steering angle ratio mechanism 20A to increase pressing force between the drive roller and the driven roller of the second mechanism 20B. This increase of the capacity enables the second mechanism 20B to transmit the torque at the slip rate smaller than that of the first mechanism 20A.

Accordingly, when the motor drives and speeds up the ring roller 8 of the second mechanism 20B to rotate, the slip rate becomes smaller in the second mechanism 20B than in the first mechanism 20A, suppressing the phase lag between the rollers to prevent the engagement of the teethed wheels of the second mechanism 20B in advance of the first mechanism 20A.

Radiuses of the rollers are determined as follows.

In the first mechanism 20A, the on-surface velocity $V_1$ of the drive roller is obtained by the following equation.

$$V_1 = \pi r \omega \tag{i}$$

where r is pitch radius of the drive roller, and $\omega$ is its angular velocity.

The pitch of the teethed wheels is expressed by the following equation.

$$p = \pi r / z \quad (j)$$

where z is the number of teeth, and the drive teethed wheel arranged in coaxial with the drive roller has a pitch radius of r.

The clearance i on the pitch circle between the adjacent teeth is determined by the following equation.

$$i = p - g \quad (k)$$

where g is a tooth thickness.

The slip rate $\alpha_1$ at transmitting torque $T_1$ is obtained by the following equation.

$$\alpha_1 = \alpha_r \times T_1 / T_{max} \quad (l)$$

where $T_{max}$ is a rating torque, and $\alpha_r$ is the slip rate at the rating torque $T_{max}$.

Advance $L_1$ of the drive roller in one rotation is expressed by the following equation.

$$L_1 = \alpha_1 \times V_1 \quad (m)$$

Accordingly, the rotation velocity $V_L$ when the drive and driven teethed wheels start to engage with each other is obtained by the following equation.

$$V_L = i / L_1 \quad (n)$$

In the second mechanism 20B, its on-surface velocity V1' is obtained by the following equation when the motor drives to speed up the ring roller 8 of the second mechanism 20B β times faster than the velocity $V_1$ of the drive roller.

$$V1' = \pi r' \omega \times \beta \quad (i')$$

where r' is a pitch radius of the drive teethed wheel of the second mechanism 20B.

The pitch of the teethed wheels of the second mechanism 20B is expressed by the following equation.

$$p' = \pi r' / z \quad (j')$$

where z is the number of teeth, and the drive teethed wheel arranged in coaxial with the drive roller has a pitch radius of r'.

The clearance i' on the pitch circle between the adjacent teeth is determined by the following equation.

$$i' = p' - g \quad (k')$$

where g is a tooth thickness.

In this seventh embodiment, roller radiuses are set larger in the second mechanism 20B than in the first mechanism 20A, so that the press force between the drive and driven rollers are increased to have the rating torque $T_{max}'$ larger than the rating torque $T_{max}$ of the first mechanism 20A. The slip rate $\alpha_1'$ at the transmitting torque $T_1$ is determined by the following equation.

$$\alpha_1' = \alpha_r \times T_1 / T_{max}' \quad (l')$$

Advance $L_1'$ of the drive roller in one rotation is expressed by the following equation.

$$L_1' = \alpha_1' \times V_1' \quad (m')$$

Accordingly, the rotation velocity $V_L'$ when the drive and driven teethed wheels start to engage with each other is obtained by the following equation.

$$V_L' = i' / L_1' \quad (n')$$

The equation (i) can be expressed by the following equation, where P'≈P, and i'≈i allowing for that r≈r'.

$$V_1' = \pi r \omega \times \beta = \beta V_1 \quad (O)$$

Advance L1' of the drive roller in one rotation is determined by the following equation.

$$L1' = \alpha 1' \times \beta V_1 \quad (m')$$

Accordingly, the rotation velocity $V_L'$ when the drive and driven teethed wheels start to engage with each other can be expressed by the following equation.

$$V_L' = i'/L_1' = I/\alpha_1' \beta V_1 \quad (n'')$$

In order to set the rotation velocities $V_L$ and $V_L'$ of the first and second mechanisms 20A and 20B to be equal to each other, the roller radiuses of them are set so as to satisfy the following equation (r).

From the equations (l) and (l'), the following equations are obtained.

$$\alpha_1 = \alpha_1' \beta \quad (p)$$

$$\alpha_r \times T_1 / T_{max} = \beta \times \alpha_r \times T_1 / T_{max}' \quad (q)$$

Therefore, the following equation is obtained.

$$T_{max}' = T_{max} \times \beta \quad (r)$$

Under the steering ratio control, a speed-up ratio β of the motor always varies, which makes it impossible to see the roller radiuses to satisfy the equation (r) at any time. In the steering system with the speed change device 250 of the seventh embodiment, the speed-up ratio β is set to be a normal speed-up ratio $\beta_1$, which is used at most frequent intervals, so that the roller radiuses of the first and second are set to satisfy the equation (r), thereby decreasing the phase lag most efficiently under the steering control.

The steering system with the speed change device 250 of the seventh embodiment has the following advantages in addition to the advantages (1), (2), (3), and (5) of the first embodiment, and the advantage (6) of the second embodiment.

(13) The torque transmitting capacity is set larger in the second variable steering angle ratio mechanism 20B than in the first variable steering angle ratio mechanism 20A, which suppresses the advance of the phase lag of the second mechanism 20B and prevents the engagement of the teethed wheels thereof in advance of that of the first mechanism 20A.

(14) The rating torque $T_{max}'$ of the second mechanism 20B is set to be a value obtained by multiplying the rating torque $T_{max}$ of the first mechanism 20A and the normal speed-up ratio $\beta_1$ that is used at most frequent intervals, which enables the phase lag under the steering control to be reduced most efficiently.

Figure 22:
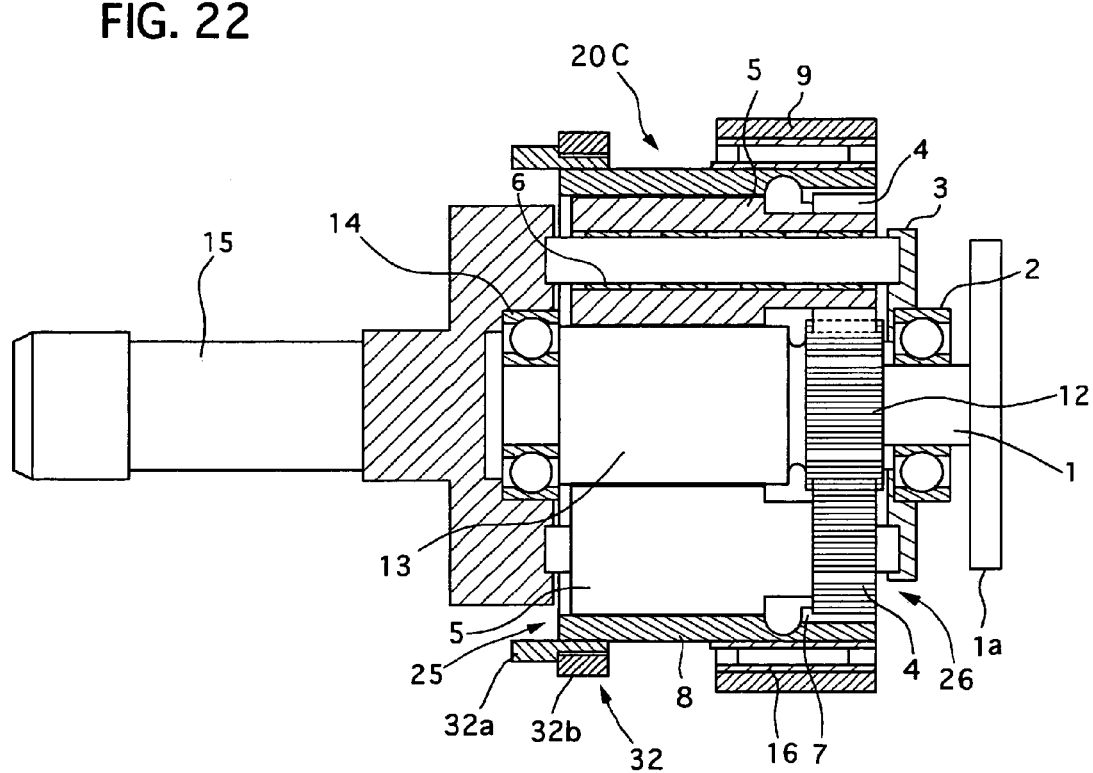
FIG. 22 is a cross sectional view showing a speed change device according to a eighth embodiment of the present invention.
Figure 23:
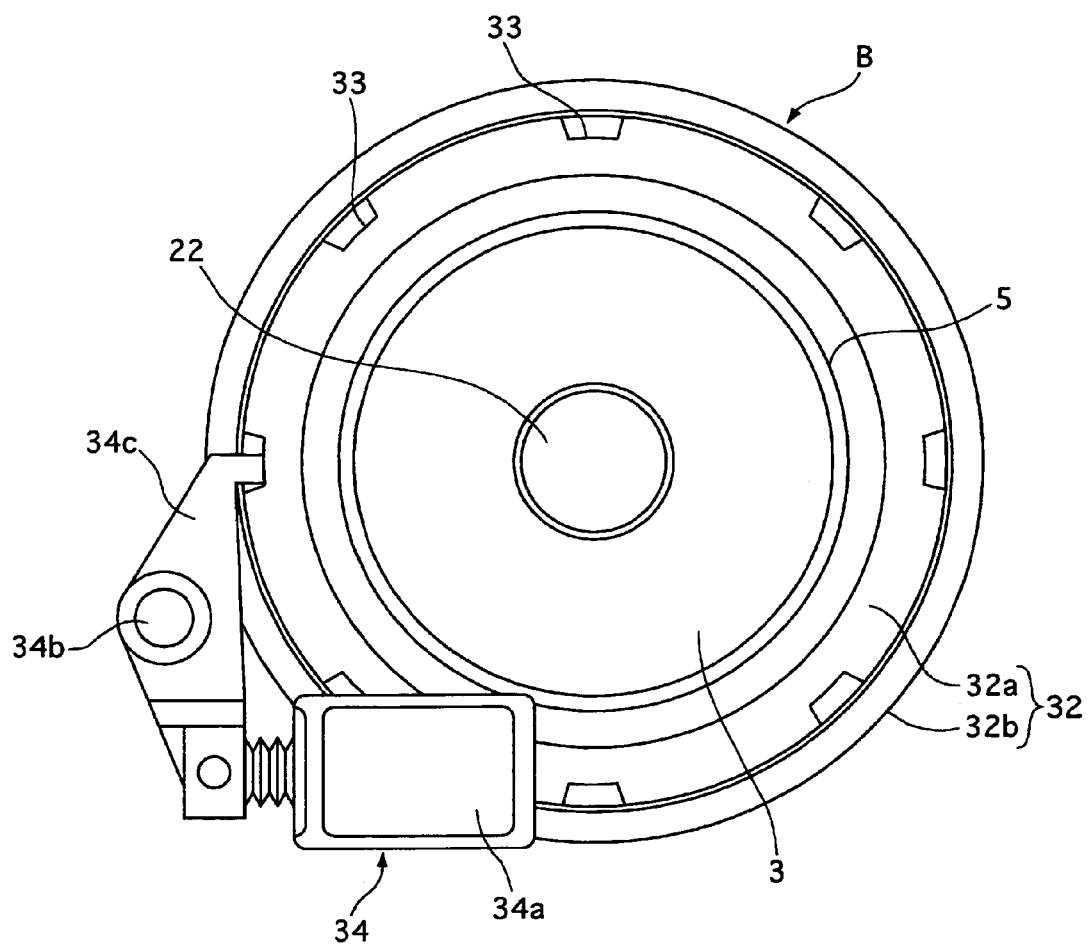
FIG. 23 is a lower view of the speed change device shown in FIG. 22.

A speed change device for a steering system according to the eighth embodiment will be described with reference to the accompanying drawings of FIG. 22 and FIG. 23.

This steering system, not shown, is similar to that of the second embodiment shown in FIG. 7, and has a speed change device 20C that is disposed between an upper part and a lower part of an upper steering shaft and has a first variable steering angle ratio mechanism and a second variable steering angle ratio mechanism that are arranged in the same direction as those of the second embodiment. The mechanisms have a planetary roller set and a planetary teethed wheel set so that a roller element of the roller set is integrally formed with a teethed wheel element of the teethed wheel set like a construction shown in FIG. 2

The speed change device 20C is equipped with a hollow electric motor 32 as a steering angle ratio control motor. The hollow motor 32 includes a rotor 32a and a stator 32b. The rotor 32a is directly connected with a ring roller 8 of a second variable steering angle ratio mechanism, and the stator 32*b* is fixed on a not-shown case. The speed change device 20C has a locking mechanism 34 to lock the hollow motor 32. The locking mechanism 34 is equipped with a solenoid 32 and a stopper 34*c* rotatable around a supporting shaft 34*c*. The solenoid 34*a* drives the stopper 34*c* to insert it in one of grooves 33 formed on an outer peripheral surface of the rotor 32*a* for locking. This locking brings the hollow motor 32 to be held to stop its speed changing function. The other parts are similar to the second embodiment.

This speed change device 20C can be constructed in compact.

Figure 24:
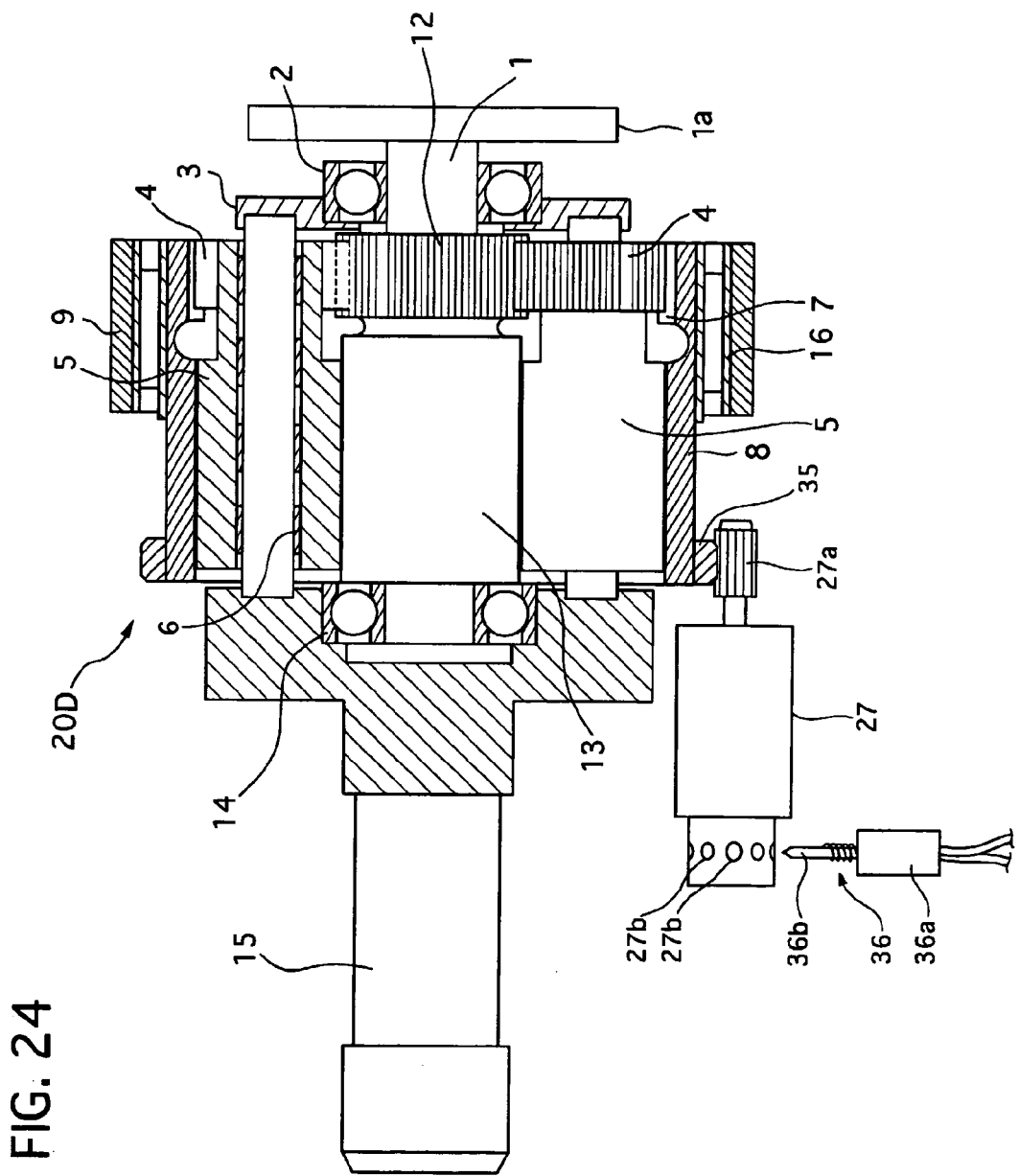
FIG. 24 is a cross sectional view showing a speed change device according to a ninth embodiment of the present invention.

A speed change device 20D for a steering system according to the ninth embodiment of the present invention will be described with reference to the accompanying drawing of FIG. 24.

This steering system, not shown, is similar to that of the second embodiment shown in FIG. 7, and has a speed change device 20D that is disposed between an upper part and a lower part of an upper steering shaft and has a first variable steering angle ratio mechanism and a second variable steering angle ratio mechanism that are arranged in the same direction as those of the second embodiment. The mechanisms have a planetary roller set and a planetary teethed wheel set so that a roller element of the roller set is integrally formed with a teethed wheel element of the teethed wheel set like a construction shown in FIG. 2.

The speed change device 20D is provided with spur gears 35 and 27*a* instead of the worm gears of the first embodiment. The spur gear 35 is fixed on the outer peripheral surface of a ring roller 8, and mated with a spur gear 27*a* provided on an output shaft of an electric motor 27. The motor 27 has a locking pin mechanism 36, which includes a solenoid 36*a*, and locking pin 36*b* actuated to move forward and backward. The solenoid 36*a* dives the locking pin 36*b* to be inserted into one of holes 27*a* formed in a rotatable shaft of the motor 27 to hold the motor 27 for locking to stop its speed changing function. The spur gears 27*a* and 35 may be replaced by helical gears.

Figure 25:
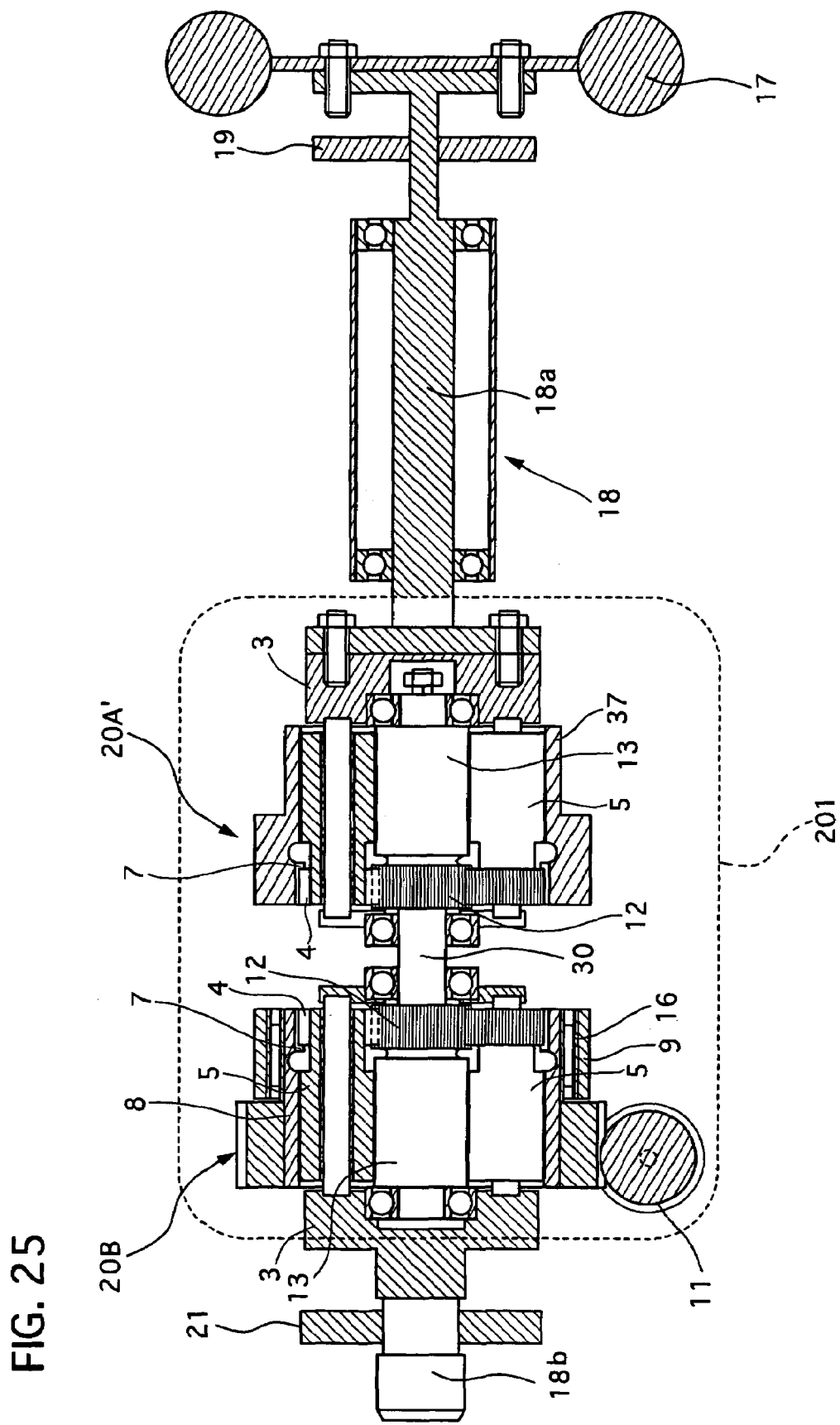
FIG. 25 is a cross sectional view showing a steering system with a speed change device according to a tenth embodiment of the present invention.

A speed change device for a steering system according to the tenth embodiment of the present invention will be described with reference to the accompanying drawing of FIG. 25.

This steering system includes a speed change device 201 that is disposed between an upper part 18*a* and a lower part 18*b* of an upper steering shaft 18 and has a first variable steering angle ratio mechanism 20A' and a second variable steering angle ratio mechanism 20B. The mechanisms 20A' and 20B have a planetary roller set and a planetary teethed wheel set so that a roller element of the roller set is integrally formed with a teethed wheel element of the teethed wheel set like a construction shown in FIG. 2. The first variable steering angle ratio mechanism 20A' has a ring roller 37 that is integrally formed with a ring teethed wheel and an outer race and is fixed a not-shown case, while the second variable steering angle ratio mechanism 20B has a ring roller 8 integrally formed with a ring gear supported by an outer race 9 of a needle roller bearing 16 through needle rollers 16*a*. The other parts of the steering system are constructed similarly to those of the second embodiment shown in FIG. 7.

This steering system of the tenth embodiment can decrease the number of its parts and its cost.

Figure 26:
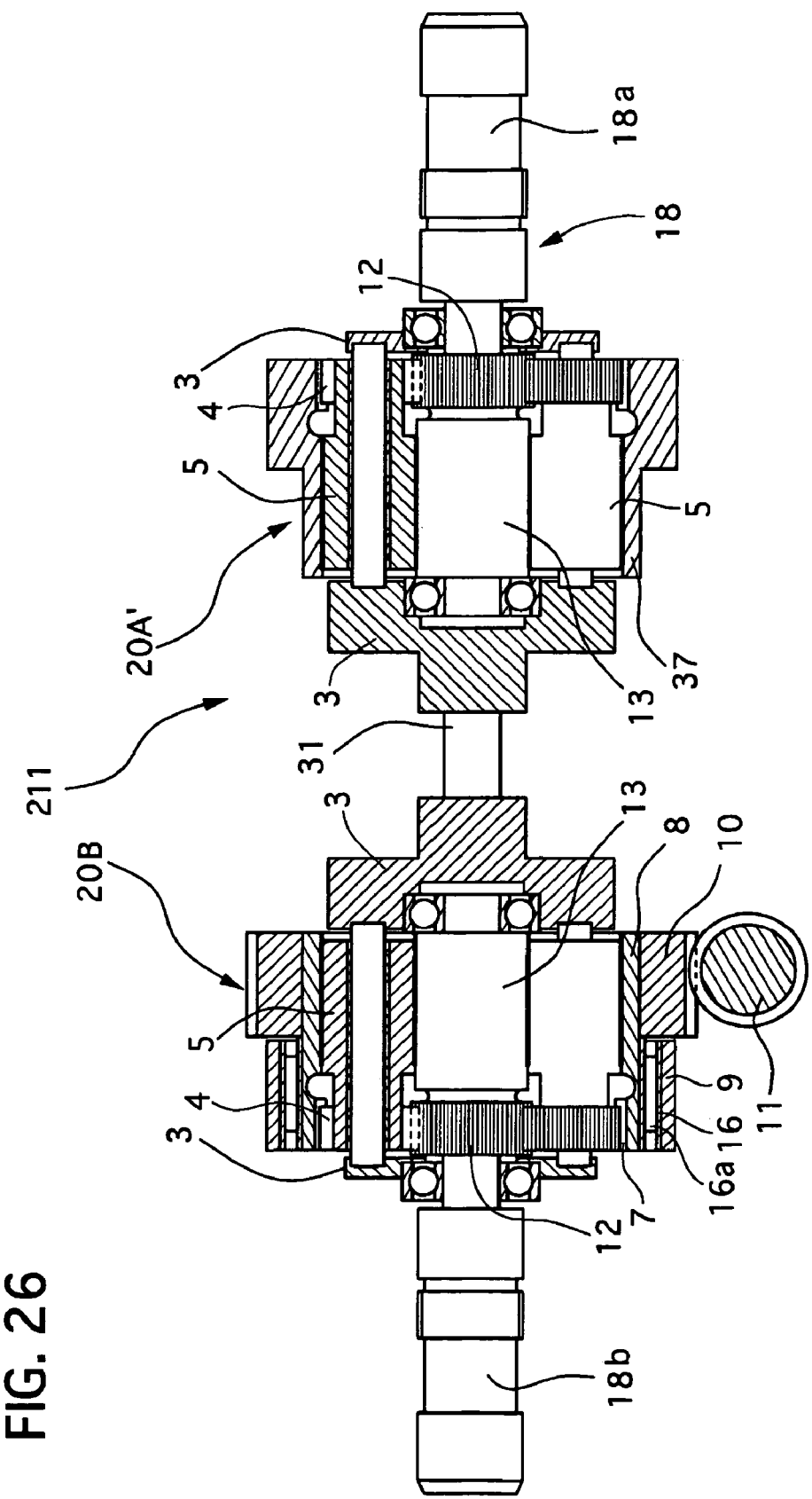
FIG. 26 is a cross sectional view showing a steering system with a speed change device according to an eleventh embodiment of the present invention.

A speed change device for a steering system according to the eleventh embodiment of the present invention will be described with reference to the accompanying drawing of FIG. 26.

This steering system includes a speed change device 211 that is disposed between an upper part 18*a* and a lower part 18*b* of an upper steering shaft 18 and has a first variable steering angle ratio mechanism 20A' and a second variable steering angle ratio mechanism 20B. The mechanisms 20A' and 20B have a planetary roller set and a planetary teethed wheel set so that a roller element of the roller set is integrally formed with a teethed wheel element of the teethed wheel set like a construction shown in FIG. 2. The first variable steering angle ratio mechanism 20A' has a ring roller 37 that is integrally formed with a ring teethed wheel and an outer race and is fixed a not-shown case, while the second variable steering angle ratio mechanism 20B has a ring roller 8 integrally formed with a ring gear supported by an outer race 9 of a needle roller bearing 16 through needle rollers 16*a*. The other parts of the steering system are constructed similarly to those of the third embodiment shown in FIG. 9.

This steering system of the eleventh embodiment can decrease the number of its parts and its cost.

Figure 27:
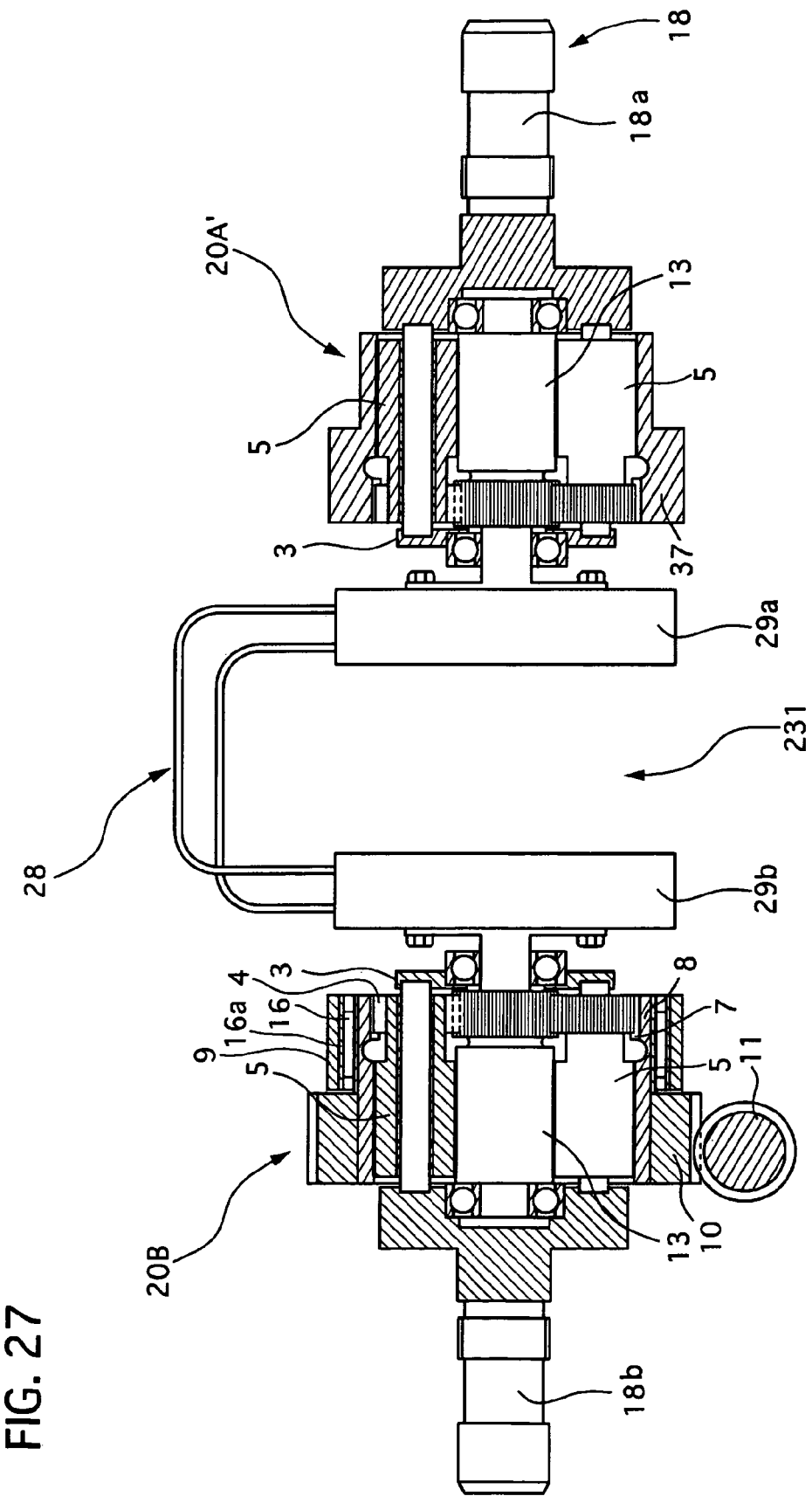
FIG. 27 is a cross sectional view showing a steering system with a speed change device according to a twelfth embodiment of the present invention.

A speed change device for a steering system according to the twelfth embodiment of the present invention will be described with reference to the accompanying drawing of FIG. 27.

This steering system includes a speed change device 221 that is disposed between an upper part 18*a* and a lower part 18*b* of an upper steering shaft 18 and has a first variable steering angle ratio mechanism 20A' and a second variable steering angle ratio mechanism 20B. The mechanisms 20A' and 20B have a planetary roller set and a planetary teethed wheel set so that a roller element of the roller set is integrally formed with a teethed wheel element of the teethed wheel set like a construction shown in FIG. 2. The first variable steering angle ratio mechanism 20A' has a ring roller 37 that is integrally formed with a ring teethed wheel and an outer race and is fixed a not-shown case, while the second variable steering angle ratio mechanism 20B has a ring roller 8 integrally formed with a ring gear supported by an outer race 9 of a needle roller bearing 16 through needle rollers 16*a*. The other parts of the steering system are constructed similarly to those of the fourth embodiment shown in FIG. 10.

This steering system of the twelfth embodiment can decrease the number of its parts and its cost.

Figure 28:
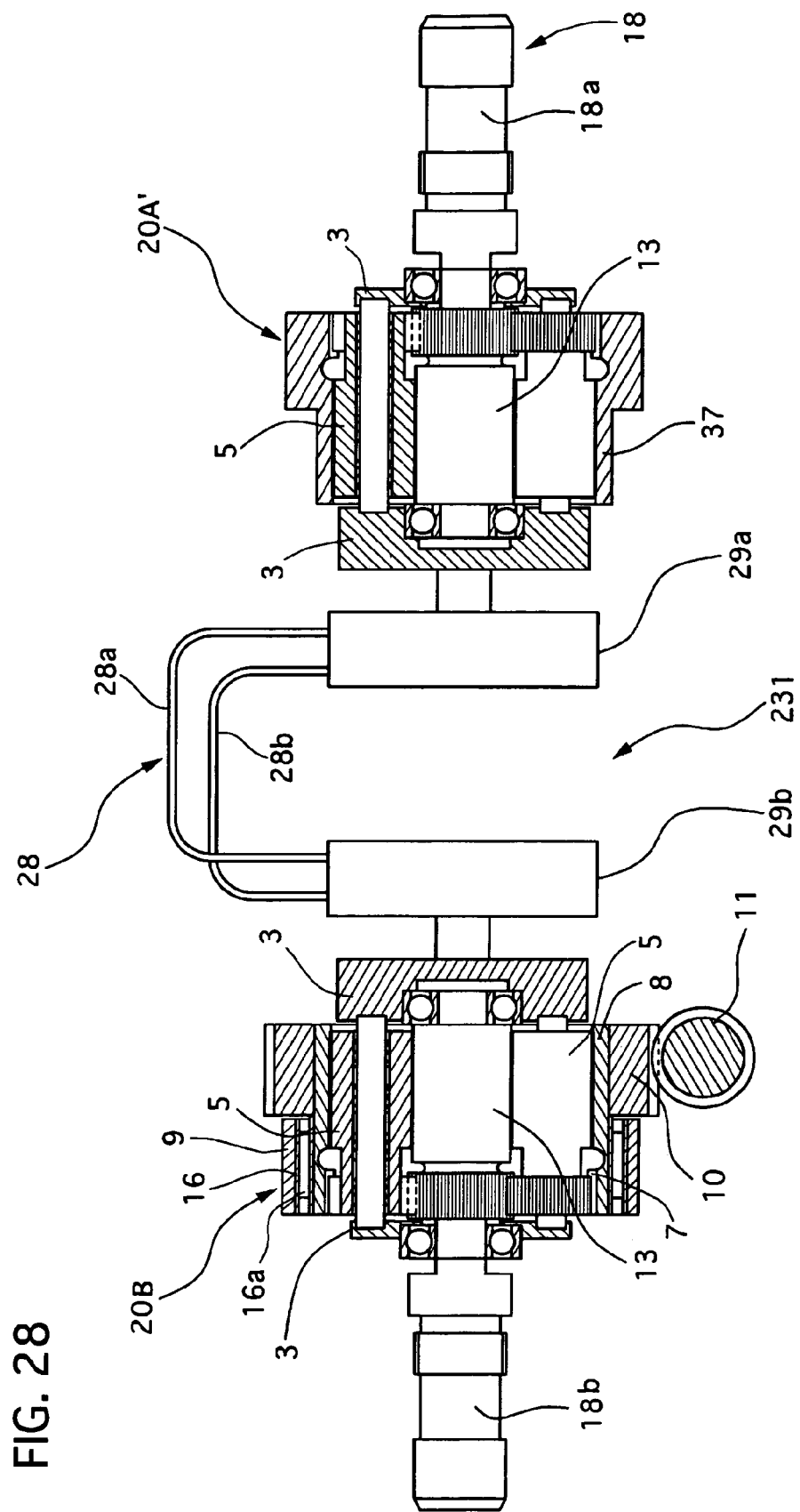
FIG. 28 is a cross sectional view showing a steering system with a speed change device according to a thirteenth embodiment of the present invention.

A speed change device for a steering system according to the thirteenth embodiment of the present invention will be described with reference to the accompanying drawing of FIG. 28.

This steering system includes a speed change device 231 that is disposed between an upper part 18*a* and a lower part 18*b* of an upper steering shaft 18 and has a first variable steering angle ratio mechanism 20A' and a second variable steering angle ratio mechanism 20B. The mechanisms 20A' and 20B have a planetary roller set and a planetary teethed wheel set so that a roller element of the roller set is integrally formed with a teethed wheel element of the teethed wheel set like a construction shown in FIG. 2. The first variable steering angle ratio mechanism 20A' has a ring roller 37 that is integrally formed with a ring teethed wheel and an outer race and is fixed a not-shown case, while the second variable steering angle ratio mechanism 20B has a ring roller 8 integrally formed with a ring gear supported by an outer race 9 of a needle roller bearing 16 through needle rollers 16*a*. The other parts of the steering system are constructed similarly to those of the fifth embodiment shown in FIG. 11.

This steering system of the eleventh embodiment can decrease the number of its parts and its cost.

A speed change device for a steering system according to the fourteenth embodiment of the present invention will be described with reference to the accompanying drawing of FIG. 29.

This steering system includes a speed change device 251 that is disposed between an upper part 18a and a lower part 18b of an upper steering shaft 18 and has a first variable steering angle ratio mechanism 20A' and a second variable steering angle ratio mechanism 20B. The mechanisms 20A' and 20B have a planetary roller set and a planetary teethed wheel set so that a roller element of the roller set is integrally formed with a teethed wheel element of the teethed wheel set like a construction shown in FIG. 2. The first variable steering angle ratio mechanism 20A' has a ring roller 37 that is integrally formed with a ring teethed wheel and an outer race and is fixed a not-shown case, while the second variable steering angle ratio mechanism 20B has a ring roller 8 integrally formed with a ring gear supported by an outer race 9 of a needle roller bearing 16 through needle rollers 16a. The other parts of the steering system are constructed similarly to those of the seventh embodiment shown in FIG. 21.

This steering system of the eleventh embodiment can decrease the number of its parts and its cost.

While there have been particularly shown and described with reference to preferred embodiments thereof, it will be understood that various modifications may be made therein, and it is intended to cover in the appended claims all such modifications as fall within the true spirit and scope of the invention.

For example, the first and second variable mechanisms 20A and 20B may be connected by a connecting rod instead of the control cable 28 shown in FIGS. 10, 11, 27, and 28.

A roller and a teethed wheel may be formed independently from each other and connected coaxially with each other.

A speed change device of this invention can be used in the other fields using the same function thereof, especially for a speed change device having an input member that is rotatable in opposite directions from a normal position within limited rotation angles, the input member transmitting higher torque as a rotation angle thereof from the normal position becomes large.

The entire contents of Japanese Patent Applications No. 2004-27064 filed Feb. 3, 2004, No. 2004-27068 filed Feb. 3, 2004, No. 2004-222321 filed Jul. 29, 2004, and No. 2005-16737, Jan. 25, 2005 are incorporated herein by reference.

What is claimed is:

1. A speed change device comprising:
  an input member that is rotatable in opposite directions from a normal position within limited rotation angles, said input member transmitting higher torque as a rotation angle thereof, with respect to the normal position, becomes larger;
  an output member; and
  a variable angle-ratio change mechanism including rollers and teethed wheels that are arranged in parallel to each other and capable of transmitting torque between said input and output members, said rollers being capable of changing a speed ratio between said input member and said output member, and said teethed wheels being capable of changing a speed ratio between said input and output members; wherein
  said rollers and said teethed wheels are respectively connected to rotate together with each other;
  said teethed wheels being provided with teeth that have a clearance on a pitch circle of said teethed wheels between adjacent teeth thereof, the clearance being set larger than a slip amount of said rollers in a low torque range where said rollers transmit low torque between said input and output members with said teethed wheels being bypassed in a normal operation; and
  said teethed wheels being engageable with each other to transmit high torque between said input and output members in a high torque range where the high torque is applied between said input and output members in an exceptional operation and said rollers slip larger than the slip amount in the low torque range.

2. A speed change device according to claim 1, wherein said rollers include a sun roller, a ring roller, planetary rollers rotatably supported by a planetary carrier and contacting the sun roller and the ring roller, one of the sun roller, the ring roller, and the planetary carrier acting as a drive wheel, and another thereof acting as a driven roller; and
  said teethed wheels including a sun teethed wheel connected with the sun roller, a ring teethed wheel connected with the ring roller, planetary teethed wheels respectively connected with the planetary rollers and rotatably supported by the planetary carrier to contact with the sun teethed wheel and the ring teethed wheel, one of the sun teethed wheel, the ring teethed wheel, and the planetary carrier acting as a drive teethed wheel, and another thereof acting as a driven teethed wheel.

3. A speed change device according to claim 2, wherein said drive teethed wheel has a pitch radius thereof smaller than an outer radius of a drive roller connected with the drive teethed wheel, and
  said driven teethed wheel having a pitch radius thereof larger than an outer radius of the driven roller connected with the driven teethed wheel.

4. A speed change device according to claim 3, wherein said rollers and said teethed wheels are set to have ratios between outer radiuses of said rollers and pitch radiuses of said teethed wheels respectively connected with said rollers set between an upper limit and a lower limit of ratios between outer radiuses of said rollers and pitch radiuses of said teethed wheels respectively connected with said rollers determined based on a rating torque and a slip rate at the rating torque of said rollers.

5. A speed change device according to claim 1, wherein said rollers have a drive roller and a driven roller, and
  said teethed wheels having a drive teethed wheel and a driven teethed wheel respectively connected to the drive roller and the driven teethed wheel, and wherein
  the drive teethed wheel has a pitch radius thereof smaller than an outer radius of the drive roller connected with the drive teethed wheel, and
  the driven teethed wheel has a pitch radius thereof larger than an outer radius of the driven roller connected with the driven teethed wheel.

6. A motor vehicle including the speed change device of claim 1, wherein:
  the input member of the speed change device is mechanically coupled to a steering wheel of the motor vehicle,
  wherein the normal position corresponds to a steering angle at which the motor vehicle runs straight on a flat level surfaced road,
  wherein normal operation corresponds to steering at high running speeds of the motor vehicle, and
  wherein exceptional operation corresponds to steering at very slow moving running speeds of the vehicle.

7. A motor vehicle including the speed change device of claim 1, wherein the teeth clearance is large.

8. A steering system comprising:
a steering wheel;
a steering gears;
a speed change device disposed between said steering wheel and said steering gears, said speed change device including a variable steering-angle-ratio change mechanism equipped with an input member connected with the steering wheel, an output member connected with the steering gears, a planetary roller set, a planetary teethed wheel set, and a steering-angle-ratio control motor, said planetary roller set and said planetary teethed wheel set being arranged in parallel to each other and between said input and output members and capable of transmitting torque between said input and output members, said planetary roller set having a sun roller, a ring roller, planetary rollers rotatably supported by a planetary carrier and contacting with the sun roller and the ring roller, said planetary teethed wheel set having a sun teethed wheel connected with the sun roller, a ring teethed wheel connected with the ring roller, planetary teethed wheels respectively connected with the planetary rollers and rotatably supported by the planetary carrier to contact with the sun teethed wheel and the ring teethed wheel, wherein
the sun roller is connected with the sun teethed wheel, the ring roller being connected with the ring teethed wheel, the planetary rollers being respectively connected with the planetary teethed wheels,
said teethed wheels being provided with teeth that have a clearance on a pitch circle of said teethed wheels between adjacent teeth thereof, the clearance being set larger than a slip amount of said rollers in a low torque range where said rollers transmit low torque between said input and output members with said teethed wheels being bypassed in a normal steering operation; and
said teethed wheels being engageable with each other to transmit high torque between said input and output members in a high torque range where the high torque is applied between said input and output members in an exceptional steering operation and said rollers slip larger than the slip amount in the low torque range.

9. A steering system according to claim 8, wherein
the steering-angle-ratio control motor is connected with the ring roller,
one of the sun teethed wheel connected with the sun roller and the planetary teethed wheels connected with the planetary rollers being connected with said input member and acting as a drive teethed wheel, and
the other of the sun teethed wheel connected with the sun roller and the planetary teethed wheels connected with the planetary rollers being connected with said output member and acting as a driven wheel.

10. A steering system according to claim 8, wherein
the sun roller connected with the sun teethed wheel is connected with said input member,
the planetary carrier is connected with said output member, and
the ring roller connected with the ring teethed wheel is connected with the steering-angle-ratio control motor.

11. A steering system according to claim 8, wherein
the steering-angle-ratio control motor has a drive gear in mesh with a driven gear connected to the ring roller connected with the ring teethed wheel so that said variable steering-angle-ratio change mechanism changes a transmission ratio thereof when the steering-angle-ratio control motor rotates the ring roller connected with the ring teethed wheel and maintains the transmission ratio when the steering-angle-ratio control motor stops the ring roller connected with the ring teethed wheel.

12. A steering system according to claim 8, wherein
the variable steering-angle-ratio change mechanism includes a first variable steering-angle-ratio change mechanism and a second variable steering-angle-ratio change mechanism,
a planetary carrier of the first variable steering-angle-ratio change mechanism being connected with said input member,
sun rollers connected with sun teethed wheels of the first and second variable steering-angle-ratio change mechanisms being connected with each other,
a planetary carrier of the second variable steering-angle-ratio change mechanism being connected with said output member, and
a ring roller connected with a ring teethed wheel of one of the first and second variable steering-angle-ratio change mechanisms being connected with the steering-angle-ratio control motor and acting as a steering-angle-ratio-control-motor controlled variable steering-angle-ratio change mechanism.

13. A steering system according to claim 12, wherein
the sun rollers connected with the sun teethed wheels of the first and second variable steering-angle-ratio change mechanisms are connected with each other by one of a control cable and a connecting rod.

14. A steering system according to claim 12, wherein
torque transmitting capacity is set larger in the steering-angle-ratio-motor controlled variable steering-angle-ratio change mechanism than in the other of the first and second variable steering-angle-ratio change mechanisms.

15. A steering system according to claim 12, wherein
rating torque is set $\beta$ times larger in the steering-angle-ratio-motor controlled variable steering-angle-ratio change mechanism than in the other of the first and second variable steering-angle-ratio change mechanisms, where $\beta$ is a normal speed-up ratio used in a steering ratio control.

16. A steering system according to claim 12, wherein
one of the first and second variable steering angle-ratio change mechanisms has the ring roller connected with the ring teethed wheel supported by an outer race through needle rollers, and
the other of the first and second variable steering angle-ratio change mechanisms having a ring roller integrally formed with a ring teethed wheel and an outer race.

17. A steering system according to claim 8, wherein
the variable steering-angle-ratio change mechanism includes a first variable steering-angle-ratio change mechanism and a second variable steering-angle-ratio change mechanism,
a sun roller connected with a sun teethed wheel of the first variable steering-angle-ratio change mechanism being connected with said input member,
planetary carriers of the first and second variable steering-angle-ratio change mechanisms being connected with each other,
a sun roller connected with a sun teethed wheel of the second variable steering-angle-ratio change mechanism being connected with said output member, and
a ring roller connected with a ring teethed wheel of one of the first and second variable steering-angle-ratio change mechanisms being connected with the steering-angle-ratio control motor and acting as a steering-angle-ratio-control-motor controlled variable steering-angle-ratio change mechanism.

18. A steering system according to claim 17, wherein the planetary carriers of the first and second variable steering-angle-ratio change mechanisms are connected with each other by one of a control cable and a connecting rod.

19. A steering system according to claim 17, wherein torque transmitting capacity is set larger in the steering-angle-ratio-control-motor controlled variable steering-angle-ratio change mechanism than in the other of the first and second variable steering-angle-ratio change mechanism.

20. A steering system according to claim 17, wherein rating torque is set β times larger in the steering-angle-ratio-motor controlled variable steering-angle-ratio change mechanism than in the other of the first and second variable steering-angle-ratio change mechanisms, where β is a normal speed-up ratio used in a steering ratio control.

21. A steering system according to claim 17, wherein one of the first and second variable steering angle-ratio change mechanisms has the ring roller connected with the ring teethed wheel supported by an outer race through needle rollers, and
the other of the first and second variable steering angle-ratio change mechanisms having a ring roller integrally formed with a ring teethed wheel and an outer race.

22. A speed change device comprising:
an input member that is rotatable in opposite directions from a normal position within limited rotation angles, said input member transmitting higher torque as a rotation angle thereof, with respect to the normal position, becomes larger;

an output member; and a variable angle-ratio change mechanism including rollers and teethed wheels that are arranged in parallel to each other and capable of transmitting torque between said input and output members, said rollers being capable of changing a speed ratio between said input member and said output member, and said teethed wheels being capable of changing a speed ratio between said input and output members; wherein said rollers and said teethed wheels are respectively connected to rotate together with each other;

said teethed wheels being provided with teeth that have a clearance on a pitch circle of said teethed wheels between adjacent teeth thereof, the clearance being set larger than a slip amount of said rollers in a low torque range where said rollers transmit low torque between said input and output members with said teethed wheels not transmitting torque in a normal operation; and said teethed wheels being engageable with each other to transmit high torque between said input and output members in a high torque range where the high torque is applied between said input and output members in an exceptional operation and said rollers slip larger than the slip amount in the low torque range.

* * * * *